United States Patent
Malladi et al.

(10) Patent No.: US 11,741,143 B1
(45) Date of Patent: Aug. 29, 2023

(54) NATURAL LANGUAGE PROCESSING TECHNIQUES FOR DOCUMENT SUMMARIZATION USING LOCAL AND CORPUS-WIDE INFERENCES

(71) Applicant: Optum, Inc., Minnetonka, MN (US)

(72) Inventors: Vijay Varma Malladi, Hyderabad (IN); Suman Roy, Bangalore (IN); Lia O. Solis Obineche, Dublin (IE); Irfan Bulu, Sartell, MN (US)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 17/815,817

(22) Filed: Jul. 28, 2022

(51) Int. Cl.
*G06F 16/34* (2019.01)
*G06F 40/284* (2020.01)
*G10L 15/26* (2006.01)

(52) U.S. Cl.
CPC .......... *G06F 16/345* (2019.01); *G06F 40/284* (2020.01); *G10L 15/26* (2013.01)

(58) Field of Classification Search
None
See application file for complete search history.

(56) References Cited

U.S. PATENT DOCUMENTS

| | | | |
|---|---|---|---|
| 6,996,414 B2 | 2/2006 | Vishwanathan et al. |
| 7,318,031 B2 | 1/2008 | Bantz et al. |
| 7,702,508 B2 | 4/2010 | Bennett |
| 7,849,147 B2 | 12/2010 | Rohall et al. |
| 7,865,560 B2 | 1/2011 | Rohall et al. |
| 7,886,012 B2 | 2/2011 | Bedi et al. |
| 8,750,489 B2 | 6/2014 | Park |
| 8,825,478 B2 | 9/2014 | Cox et al. |
| 8,914,452 B2 | 12/2014 | Boston et al. |
| 8,983,840 B2 | 3/2015 | Deshmukh et al. |
| 9,116,984 B2 | 8/2015 | Caldwell et al. |
| 9,118,759 B2 | 8/2015 | Krishnapuram et al. |
| 9,300,790 B2 | 3/2016 | Gainsboro et al. |
| 9,348,817 B2 | 5/2016 | Bohra et al. |
| 9,413,877 B2 | 8/2016 | Aldrich et al. |
| 9,565,301 B2 | 2/2017 | Lee et al. |
| 10,009,464 B2 | 6/2018 | Slovacek |

(Continued)

OTHER PUBLICATIONS

B. Ma, H. Sun, J. Wang, Q. Qi and J. Liao, "Extractive Dialogue Summarization Without Annotation Based on Distantly Supervised Machine Reading Comprehension in Customer Service," Jan. 1, 2022, IEEE/ACM Transactions on Audio, Speech, and Language Processing, vol. 30, pp. 87-97 (Year: 2022).*

(Continued)

*Primary Examiner* — Ariel Mercado
(74) *Attorney, Agent, or Firm* — Alston & Bird LLP

(57) ABSTRACT

As described herein, various embodiments of the present invention provide methods, apparatus, systems, computing devices, computing entities, and/or the like for performing natural language processing operations using a combination of a cross-token attention machine learning, a cross-utterance attention machine learning model, and an integer linear programming joint keyword-utterance optimization model to select an extractive keyword summarization of a multi-party communication transcript data object that comprises a selected utterance subset of U utterances (e.g., U sentences) of a document data object and a selected keyword subset of K candidate keywords of the document data object.

20 Claims, 9 Drawing Sheets

(56) References Cited

U.S. PATENT DOCUMENTS

| | | | |
|---|---|---|---|
| 10,051,122 | B2 | 8/2018 | Raanani et al. |
| 10,204,158 | B2 | 2/2019 | Hay et al. |
| 10,353,904 | B2 | 7/2019 | Enders et al. |
| 10,354,677 | B2 | 7/2019 | Mohamed et al. |
| 10,628,474 | B2 | 4/2020 | Modani et al. |
| 10,637,898 | B2 | 4/2020 | Cohen et al. |
| 10,659,585 | B1 | 5/2020 | Graham et al. |
| 10,785,185 | B2 | 9/2020 | Vennam et al. |
| 11,018,885 | B2 | 5/2021 | Niekrasz |
| 11,070,673 | B1 | 7/2021 | Lemus et al. |
| 11,115,353 | B1 | 9/2021 | Crowley et al. |
| 11,228,681 | B1 | 1/2022 | Rosenberg |
| 11,232,266 | B1 | 1/2022 | Biswas et al. |
| 11,272,058 | B2 | 3/2022 | Khafizov et al. |
| 11,315,569 | B1 | 4/2022 | Talieh et al. |
| 11,487,797 | B2 * | 11/2022 | Shukla ............... G06F 16/3347 |
| 2010/0088299 | A1 | 4/2010 | O'Sullivan et al. |
| 2014/0200928 | A1 | 7/2014 | Watanabe et al. |
| 2015/0154956 | A1 | 6/2015 | Brown |
| 2016/0277577 | A1 | 9/2016 | Yentis et al. |
| 2017/0054837 | A1 | 2/2017 | Choi et al. |
| 2019/0042645 | A1 | 2/2019 | Othmer et al. |
| 2019/0297186 | A1 | 9/2019 | Karani |
| 2019/0373111 | A1 | 12/2019 | Rute et al. |
| 2020/0074312 | A1 | 3/2020 | Liang et al. |
| 2020/0137224 | A1 | 4/2020 | Rakshit et al. |
| 2020/0227026 | A1 | 7/2020 | Rajagopal et al. |
| 2020/0334419 | A1 | 10/2020 | Raanani et al. |
| 2021/0133251 | A1 * | 5/2021 | Tiwari ................ G06F 40/205 |
| 2021/0182326 | A1 | 6/2021 | Romano et al. |
| 2021/0264897 | A1 | 8/2021 | Churav et al. |
| 2021/0272040 | A1 * | 9/2021 | Johnson ................ G06F 40/30 |
| 2021/0304747 | A1 | 9/2021 | Haas et al. |
| 2021/0334469 | A1 * | 10/2021 | Feng ..................... G06F 40/30 |
| 2021/0342554 | A1 * | 11/2021 | Martin ................. G06F 40/151 |
| 2021/0375289 | A1 * | 12/2021 | Zhu ....................... G06F 40/56 |
| 2022/0030110 | A1 | 1/2022 | Khafizov et al. |
| 2022/0067269 | A1 | 3/2022 | de Oliveira et al. |
| 2022/0068279 | A1 * | 3/2022 | Embar ................... G06F 40/30 |
| 2022/0108086 | A1 | 4/2022 | Wu et al. |
| 2022/0109585 | A1 | 4/2022 | Asthana et al. |
| 2022/0189484 | A1 | 6/2022 | Malladi et al. |
| 2022/0337443 | A1 * | 10/2022 | Sood .................... G06F 16/735 |
| 2022/0414338 | A1 * | 12/2022 | Cho ...................... G06F 40/35 |

OTHER PUBLICATIONS

Xu, Shusheng et al. "Unsupervised Extractive Summarization by Pre-Training Hierarchical Transformers," arXiv Preprint arXiv:2010.08242v1 [cs.CL], Oct. 16, 2020, (15 pages), Shanghai, China.

Yang, Zichao et al. "Hierarchical Attention Networks for Document Classification," Proceedings of the NAACL-HLT 2016, Association for Computational Linguistics, Jun. 12, 2016, pp. 1480-1489, San Diego, California.

Yih, Wen-tau et al. "Multi-Document Summarization by Maximizing Informative Content-Words," In IJCAI, Jan. 6, 2007, vol. 7, pp. 1776-1782. [Available online: https://www.aaai.org/Papers/IJCAI/2007/IJCAI07-287.pdf].

Yuliska et al. "A Comparative Study of Deep Learning Approaches for Query-Focused Extractive Multi-Document Summarization," 2019 IEEE 2nd International Conference on Information and Computer Technologies (ICICT), May 13, 2019, pp. 153-157, doi: 10.1109/INFOCT.2019.8710851.

Zhang, Xingxing et al. "HIBERT: Document Level Pre-training of Hierarchical Bidirectional Transformers for Document Summarization," arXiv Preprint arXiv: 1905.06566v1 [cs.CL] May 16, 2019, (11 pages), available online at https://arxiv.org/pdf/1905.06566.pdf.

Zhou, Peng et al. "Attention-Based Bidirectional Long Short-Term Memory Networks for Relation Classification," Proceedings of the 54th Annual Meeting of the Association for Computational Linguistics, pp. 207-212, Aug. 7, 2016, Berlin, Germany.

Zweig, Geoffrey et al. "Automated Quality Monitoring for Call Centers Using Speech and NLP Technologies," Proceedings of the Human Language Technology Conference of the NAACL, Companion Volume, pp. 292-295, Jun. 2006.

Stepanov, E. et al. "Automatic Summarization of Call-Center Conversations," In Conference: IEEE Automatic Speech Recognition and Understanding Workshop (ASRU 2015), (2 pages), Dec. 2015, available online: http://sisl.disi.unitn.it/wp-content/uploads/2015/11/ASRU15-SpeechSummarizationDemo.pdf.

Trione, Jeremy et al. "Beyond Utterance Extraction: Summary Recombination for Speech Summarization," In Interspeech, pp. 680-684, Sep. 2016, available online: https://pageperso.lis-lab.fr/benoit.favre/papers/favre_is2016a.pdf.

Zhong, Junmei et al. "Predicting Customer Call Intent by Analyzing Phone Call Transcripts Based on CNN for Multi-Class Classification," Computer Science & Information Technology (CS & IT), pp. 9-20, arXiv preprint arXiv:1907.03715, Jul. 8, 2019, (12 pages), available online: https://arxiv.org/ftp/arxiv/papers/1907/1907.03715.pdf.

NonFinal Office Action for U.S. Appl. No. 17/122,607, dated Nov. 8, 2022, (58 pages), United States Patent and Trademark Office, US.

Vanetik, Natalia et al. "An Unsupervised Constrained Optimization Approach to Compressive Summarization," Information Sciences, vol. 509, Jan. 2020, pp. 22-35.

"Summarize Text With the Extractive Summarization API," Azure Cognitive Services|Microsoft Docs, Mar. 16, 2022, (6 pages) [Retrieved from the Internet May 4, 2022] <URL: https://docs.microsoft.com/en-us/azure/cognitive-services/language-service/text-summarization/how-to/call-api>.

"Supercharge Your Call Notes—Automated Call Recording and Transcription," Jog.Ai, (6 pages), (online), [Retrieved from the Internet Nov. 15, 2021] <URL: https://jog.ai/>.

Banerjee, Siddhartha et al. "Multi-Document Abstractive Summarization Using ILP Based Multi-Sentence Compression," Proceedings of the Twenty-Fourth International Joint Conference on Artificial Intelligence (IJCAI 2015), pp. 1208-1214, Jun. 23, 2015.

Baumel, Tai et al. "Query Focused Abstractive Summarization: Incorporating Query Relevance, Multi-Document Coverage, and Summary Length Constraints Into seq2seq Models," arXiv Preprint, arXiv: 1801.07704v2, Jan. 25, 2018, (9 pages).

Baumel, Tai et al. "Topic Concentration in Query-Focused Summarization," Proceedings of the Thirtieth AAAI Conference on Artificial Intelligence (AAAI-16), pp. 2573-2579, Mar. 5, 2016.

Biswas, Pratik K. et al. "Extractive Summarization of Call Transcripts," arXiv Preprint arXiv:2103.10599, Mar. 19, 2021, (10 pages).

Brin, Sergey. "The PageRank Citation Ranking: Bringing Order to the Web," Proceedings of ASIS, vol. 98, Jan. 29, 1998, (17 pages).

Canhasi, Ercan. "Ercan Canhasi: Query Focused Multi Document Summarization Based on the Multi Facility Location Problem," Computer Science On-Line Conference, Artificial Intelligence Trends in Intelligent Systems, CSOC 2017, Advances in Intelligent Systems and Computing, vol. 573, Springer, Cham., Apr. 7, 2017, pp. 210-219, DOI: 10.1007/978-3-319-57261-1_21.

Chandramouli, Aravind et al. "Unsupervised Paradigm for Information Extraction From Transcripts Using BERT," arXiv Preprint arXiv:2110.00949, Oct. 3, 2021, (11 pages).

Chen, Yun-Nung et al. "Intra-Speaker Topic Modeling for Improved Multi-Party Meeting Summarization With Integrated Random Walk," In Proceedings of the 2012 Conference of the North American Chapter of the Association for Computational Linguistics: Human Language Technologies, Jun. 2012, pp. 377-381.

Dang, Hoa Trang. "Overview of DUC 2005," In Proceedings of the Document Understanding Conference, Oct. 9, 2005, vol. 2005, (12 pages). [Available online https://www-nlpir.nist.gov/projects/duc/pubs/2005papers/OVERVIEW05.pdf].

Devlin, Jacob et al. "BERT: Pre-Training of Deep Bidirectional Transformers for Language Understanding," Proceedings of NAACL-HLT 2019, Jun. 2, 2019, pp. 4171-4186.

Feigenblat, Guy et al. "Unsupervised Query-Focused Multi-Document Summarization Using the Cross Entropy Method," SIGIR '17: Proceedings of the 40th International ACM SIGIR Conference

(56) References Cited

OTHER PUBLICATIONS on Research and Development in Information Retrieval, Aug. 7, 2017, pp. 961-964, DOI: 10.1145/3077136.3080690.
Filatova, Elena et al. "Event-Based Extractive Summarization," In Proceedings of ACL Workshop on Summarization, vol. 111, (2004), (8 pages).
Garg, Nikhil et al. "ClusterRank: A Graph Based Method for Meeting Summarization," IDIAP Research Institute, Jun. 2009, (5 pages), Martigny, Switzerland.
Gillick, Dan et al. "A Scalable Global Model for Summarization," In Proceedings of the NAACL HLT Workshop on Integer Linear Programming for Natural Language Processing, Jun. 2009, pp. 10-18.
Goldstein, Jade et al. "Summarization: (1) Using MMR for Diversity-Based Reranking and (2) Evaluating Summaries," Carnegie-Mellon University, Language Technologies Institute, Tipster III Summarization Project, Oct. 1, 1998, pp. 181-195.
Gupta, Surabhi et al. "Measuring Importance and Query Relevance in Topic-Focused Multi-Document Summarization," 45th Annual Meeting of the Association for Computational Linguistics Demo and Poster Sessions, Jun. 2007, pp. 193-196.
Hearst, Marti A. "Text-Tiling: A Quantitative Approach to Discourse Segmentation," Association for Computational Linguistics 1993 (1993), pp. 1-10.
Higashinaka, Ryuichiro et al. "Improving HMM-Based Extractive Summarization for Multi-Domain Contact Center Dialogues," In 2010 IEEE Spoken Language Technology Workshop, Dec. 12, 2010, pp. 61-66. DOI: 10.1109/SLT.2010.5700823.
Kothadiya, Aditya. "Why We Built a Note Taking Software—A Tool That Automatically Takes Notes and Analyzes Sales and Customer Calls," Avoma Blog, (article, online), [Retrieved from the Internet Nov. 15, 2021] <https://www.avoma.com/blog/ai-note-taking-software>.
Li, Chen et al. "Using Supervised Bigram-Based ILP for Extractive Summarization," In Proceedings of the 51st Annual Meeting of the Association for Computational Linguistics, Aug. 4, 2013, pp. 1004-1013, Sofia, Bulgaria.
Liang, Xinnian et al. "Unsupervised Keyphrase Extraction by Jointly Modeling Local and Global Context," arXiv Preprint arXiv:2109.07293v1 [cs.CL], Sep. 15, 2021, (10 pages).
Liu, Yang et al. "Text Summarization With Pretrained Encoders," arXiv Preprint arXiv:1908.08345v2 [cs.CL], Sep. 5, 2019, (11 pages).
McDonald, Ryan. "A Study of Global Inference Algorithms in Multi-Document Summarization," In European Conference on Information Retrieval, Apr. 2, 2007, (12 pages), Springer, Berlin, Heidelberg. [Available online: https://storage.googleapis.com/pub-tools-public-publication-data/pdf/32687.pdf].
Mehdad, Yashar et al. "Abstractive Meeting Summarization with Entailment and Fusion," In Proceedings of the 14th European Workshop on Natural Language Generation, Aug. 2013, pp. 136-146. [Available online: https://www.aclweb.org/anthology/W13-2117.pdf].
Murray, Gabriel et al. "Generating and Validating Abstracts of Meeting Conversations: A User Study," In Proceedings of the 6th International Natural Language Generation Conference (2010), (9 pages). [Available online: https://www.aclweb.org/anthology/W10-4211.pdf].
Narayan, Shashi et al. "Stepwise Extractive Summarization and Planning With Structured Transformers," arXiv Preprint arXiv:2010.02744v1 [cs.CL], Oct. 6, 2020, (17 pages).

Nenkova, Ani et al. "The Impact of Frequency on Summarization," Technical Report MSRTR-2005-101, Microsoft Research, Jan. 2005, (9 pages), Redmond, Washington. [Available online: http://citeseerx.ist.psu.edu/viewdoc/download?doi=10.1.1.529.6099&rep=rep1&type=pdf].
Oya, Tatsuro et al. "A Template-Based Abstractive Meeting Summarization: Leveraging Summary and Source Text Relationships," In Proceedings of the 8th International Natural Language Generation Conference (INLG), Jun. 2014, pp. 45-53. [Available online: https://www.aclweb.org/anthology/W14-4407.pdf].
Padmakumar, Vishakh et al. "Unsupervised Extractive Summarization Using Pointwise Mutual Information," arXiv Preprint arXiv:2102.06272v2 [cs.CL], Mar. 22, 2021, (8 pages).
Radev, Dragomir R. et al. "Ranking Suspected Answers to Natural Language Questions Using Predictive Annotation," ANLC '00: Proceedings of the Sixth Conference on Applied Natural Language Processing, Apr. 29, 2000, pp. 150-157, https://doi.org/10.3115/974147.974168.
Rahman, Nazreena et al. "A Method for Semantic Relatedness Based Query Focused Text Summarization," In International Conference on Pattern Recognition and Machine Intelligence (PReMI 2017), LNCS 10597, Springer, Cham., pp. 387-393, Dec. 5, 2017, doi: 10.1007/978-3-319-69900-4_49.
Rudra, Koustav et al. "Summarizing Situational Tweets in Crisis Scenarios: An Extractive-Abstractive Approach," IEEE Transactions on Computational Social Systems, Sep. 16, 2019, vol. 6, No. 5, pp. 981-993.
Rudra, Koustav. "Extracting and Summarizing Information From Microblogs During Disasters," Ph.D. Thesis, Apr. 2018, (199 pages).
Shang, Guokan et al. "Unsupervised Abstractive Meeting Summarization with Multi-Sentence Compression and Budgeted Submodular Maximization," In Proceedings of the 56th Annual Meeting of the Association for Computational Linguistics (Long Papers), Jul. 15, 2018, pp. 664-674, Melbourne, Australia. [Available online: https://www.aclweb.org/anthology/P18-1062.pdf].
Singer, Eleanor et al. "Some Methodological Uses of Responses to Open Questions and Other Verbatim Comments in Quantitative Surveys," Methods, Data, Analyses: A Journal for Quantitative Methods and Survey Methodology (mda), vol. 11, No. 2, (2017), pp. 115-134, DOI: 10.12758/mda.2017.01.
Steinberger, Josef et al. "Evaluation Measures for Text Summarization," Computing and Informatics, vol. 28, Mar. 2, 2009, pp. 1001-1026.
Sun, Xu et al. "Feature-Frequency-Adaptive On-Line Training for Fast and Accurate Natural Language Processing," Computational Linguistic, vol. 40, No. 3, Sep. 1, 2014, pp. 563-586.
Ushio, Asahi et al. "Back to the Basics: A Quantitative Analysis of Statistical and Graph-Based Term Weighting Schemes for Keyword Extraction," arXiv Preprint arXiv:210408028v2 [cs.LG], Sep. 13, 2021, (15 pages), United Kingdom.
Vanetik, Natalia et al. "Query-Based Summarization Using MDL Principle," Proceedings of the MultiLing 2017 Workshop on Summarization and Summary Evaluation Across Source Types and Genres, Association for Computational Linguistics, pp. 22-31, Apr. 3, 2017, Valencia, Spain.
Vreeken, Jilles et al. "KRIMP: Mining Itemsets That Compress," Data Mining and Knowledge Discovery, Jul. 2011, vol. 23, No. 1, pp. 169-214, DOI: 10.1007/s10618-010-0202-x.
Notice of Allowance and Fee(s) Due for U.S. Appl. No. 17/122,607, dated Mar. 28, 2023, (8 pages), United States Patent and Trademark Office, US.

* cited by examiner

Call Transcript: 500

0:Thank you for calling my name is Craig number first and last name please  1:Hi Craig my name is amisha I'm calling from independent across the first name is said FAAB
1:last name is CHORRAISHI
0:I do have your account pulled up and verify how can I help you
1:so he's calling because he said he just went to the Dom the pharmacy they got on
1:I guess the medication for the colonoscopy before he go an they charged him $100 he stated he just wanted to make sure it was correct
0:give me one second please will do some research into account
0:thank you
0:I'm still here I'm doing some refer to screen for the plan doc
1:no problem
0:the movie prep solution that he paid $100 for
1:yes yes yes
0:OK give me one second
0:2017700001
0:OK see my guess is they charged him a discounted prices because that is in tier 3 medication
0:and it's going towards out of pocket deductible
1:OK so it is considered a tier 3
0:yes ma'am for temporary access is supposed to be more unfortunately medications $160 but they only charge from 160 give me one it's a 10 i $150 and they don't they only charged him $101 for it
0:but that is typically medication so that's why that's the price and then is the price of the medication
1:OK all right thank you so much

FIG. 5

Summary:

Channel 1: I guess the medication for the colonoscopy before he go an they charged him $100 he stated he just wanted to make sure it was correct Channel 0: OK see my guess is they charged him a discounted price because that is a tier 3 medication and it's going towards out of pocket deductible Key phrases:
1. medication
2. pocket deductible
3. charge
4. discounted price

FIG. 9

NATURAL LANGUAGE PROCESSING TECHNIQUES FOR DOCUMENT SUMMARIZATION USING LOCAL AND CORPUS-WIDE INFERENCES

BACKGROUND

Various embodiments of the present invention address technical challenges related to performing natural language processing and provide solutions to address the efficiency and reliability shortcomings of existing natural language processing solutions.

BRIEF SUMMARY

In general, various embodiments of the present invention provide methods, apparatus, systems, computing devices, computing entities, and/or the like for performing natural language processing operations using a combination of a cross-token attention machine learning, a cross-utterance attention machine learning model, and an integer linear programming joint keyword-utterance optimization model to select an extractive keyword summarization of a multi-party communication transcript data object that comprises a selected utterance subset of U utterances (e.g., U sentences) of a document data object and a selected keyword subset of K candidate keywords of the document data object.

In accordance with one aspect, a method is provided. In one embodiment, the method comprises: (i) identifying a plurality of utterances associated with a document data object; (ii) for each utterance: (a) generating, using a cross-utterance attention machine learning model, an attention-based utterance representation, wherein the cross-utterance attention machine learning model is configured to: (1) for each utterance pair, generate a cross-utterance self-attention weight, and (2) generate the attention-based utterance representation for the utterance based at least in part on each cross-utterance self-attention weight that is associated with the utterance, (b) generating, based at least in part on the attention-based utterance representation and an utterance-based document representation that is generated based at least in part on each attention-based utterance representation, a document-utterance similarity score for the utterance, and (c) generating, based at least in part on a local utterance correlation graph data object and the document-utterance similarity score for the utterance, an utterance score for the utterance, wherein each utterance correlation edge of the local utterance correlation graph data object corresponds to a respective utterance pair and is associated with an utterance correlation edge weight that is generated based at least in part on the cross-utterance self-attention weight for the respective utterance pair; (ii) generating an extractive summarization based at least in part on each utterance score; and (iii) performing one or more prediction-based actions based at least in part on each utterance score.

In accordance with another aspect, an apparatus comprising at least one processor and at least one memory including computer program code is provided. In one embodiment, the at least one memory and the computer program code may be configured to, with the processor, cause the apparatus to: (i) identify a plurality of utterances associated with a document data object; (ii) for each utterance: (a) generate, using a cross-utterance attention machine learning model, an attention-based utterance representation, wherein the cross-utterance attention machine learning model is configured to: (1) for each utterance pair, generate a cross-utterance self-attention weight, and (2) generate the attention-based utterance representation for the utterance based at least in part on each cross-utterance self-attention weight that is associated with the utterance, (b) generate, based at least in part on the attention-based utterance representation and an utterance-based document representation that is generated based at least in part on each attention-based utterance representation, a document-utterance similarity score for the utterance, and (c) generate, based at least in part on a local utterance correlation graph data object and the document-utterance similarity score for the utterance, an utterance score for the utterance, wherein each utterance correlation edge of the local utterance correlation graph data object corresponds to a respective utterance pair and is associated with an utterance correlation edge weight that is generated based at least in part on the cross-utterance self-attention weight for the respective utterance pair; (ii) generate an extractive summarization based at least in part on each utterance score; and (iii) perform one or more prediction-based actions based at least in part on each utterance score.

In accordance with yet another aspect, a computer program product is provided. The computer program product may comprise at least one computer-readable storage medium having computer-readable program code portions stored therein, the computer-readable program code portions comprising executable portions configured to: (i) identify a plurality of utterances associated with a document data object; (ii) for each utterance: (a) generate, using a cross-utterance attention machine learning model, an attention-based utterance representation, wherein the cross-utterance attention machine learning model is configured to: (1) for each utterance pair, generate a cross-utterance self-attention weight, and (2) generate the attention-based utterance representation for the utterance based at least in part on each cross-utterance self-attention weight that is associated with the utterance, (b) generate, based at least in part on the attention-based utterance representation and an utterance-based document representation that is generated based at least in part on each attention-based utterance representation, a document-utterance similarity score for the utterance, and (c) generate, based at least in part on a local utterance correlation graph data object and the document-utterance similarity score for the utterance, an utterance score for the utterance, wherein each utterance correlation edge of the local utterance correlation graph data object corresponds to a respective utterance pair and is associated with an utterance correlation edge weight that is generated based at least in part on the cross-utterance self-attention weight for the respective utterance pair; (ii) generate an extractive summarization based at least in part on each utterance score; and (iii) perform one or more prediction-based actions based at least in part on each utterance score.

BRIEF DESCRIPTION OF THE DRAWINGS

Figure 1:
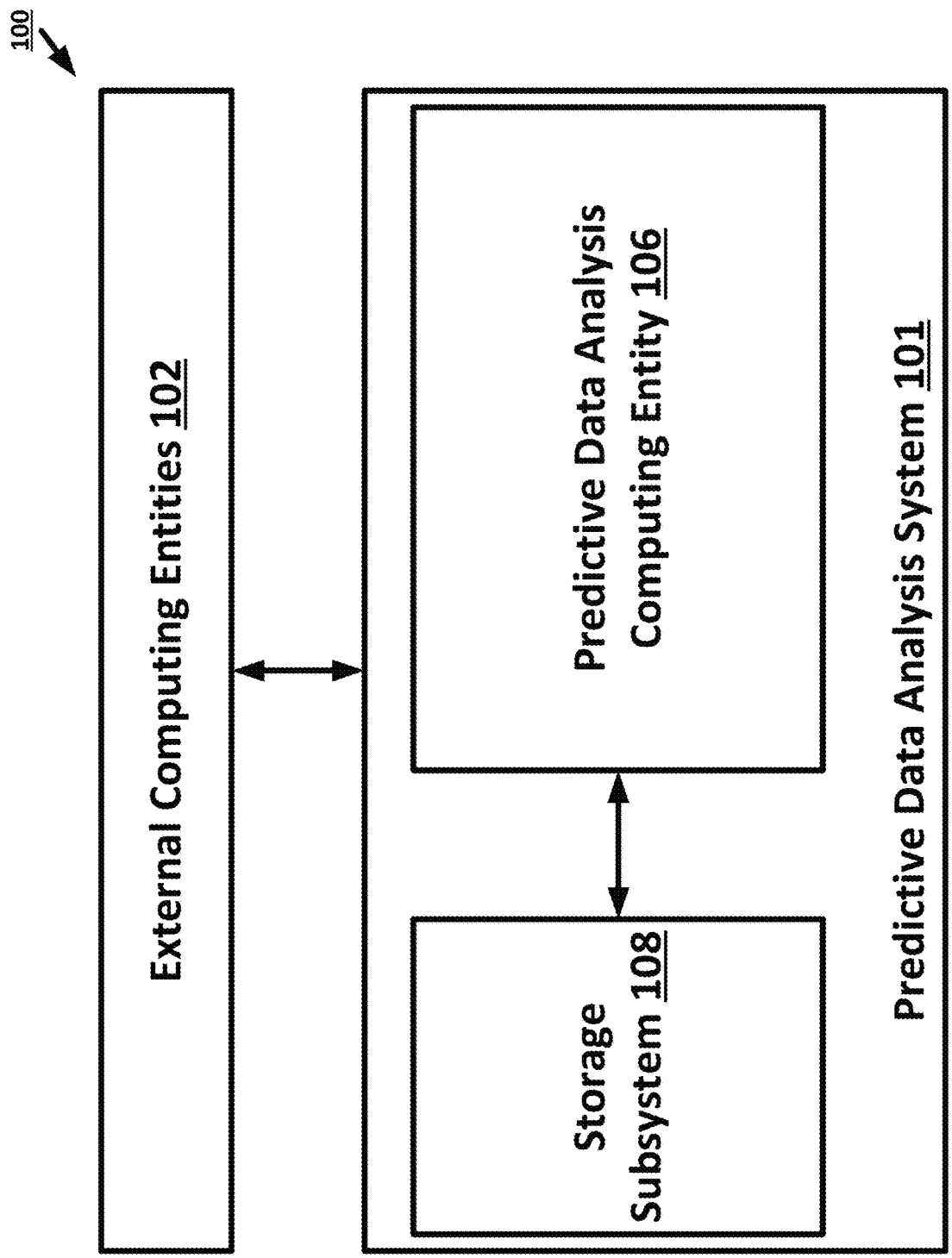

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
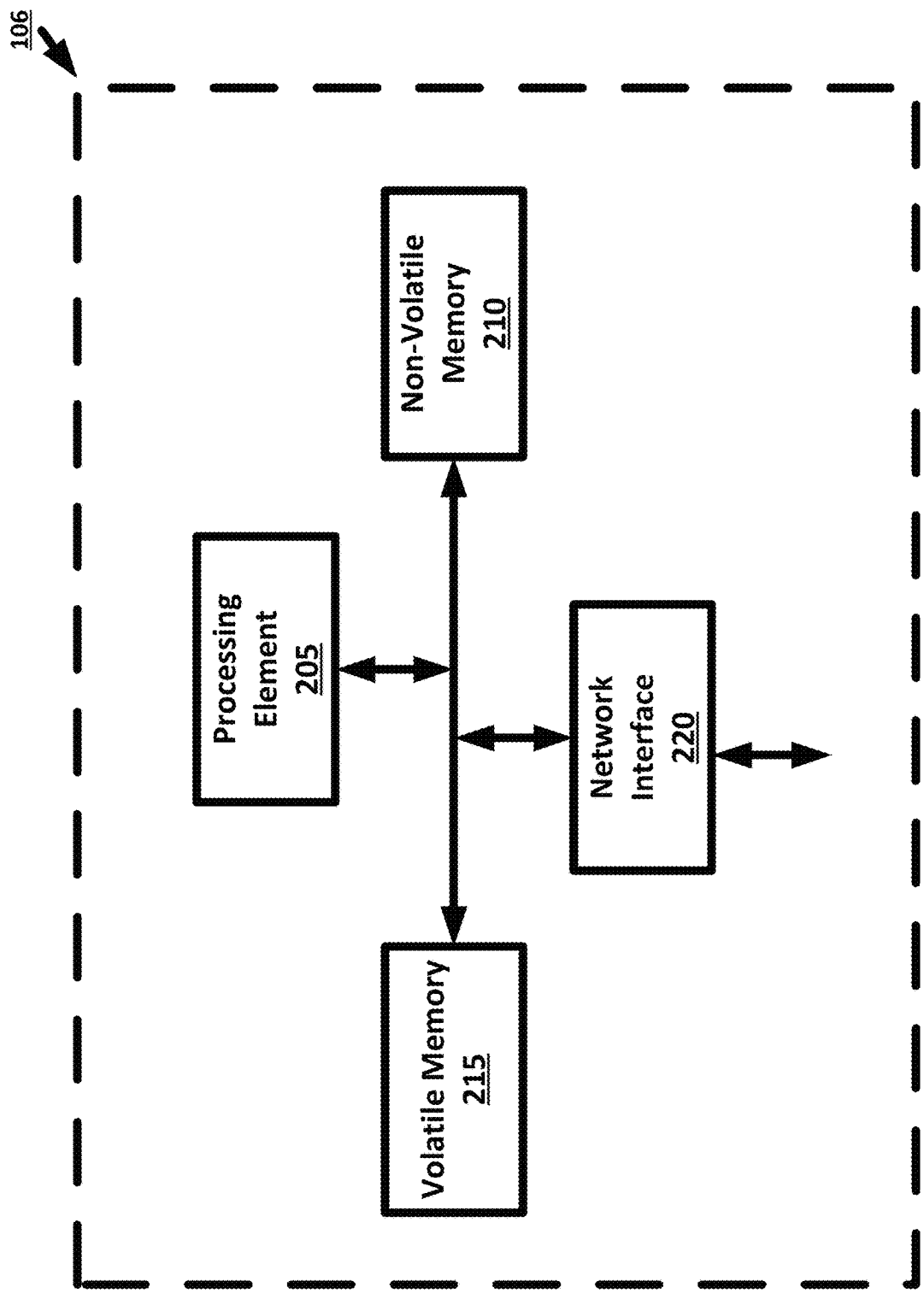

FIG. 2 provides an example predictive data analysis computing entity in accordance with some embodiments discussed herein.

Figure 3:
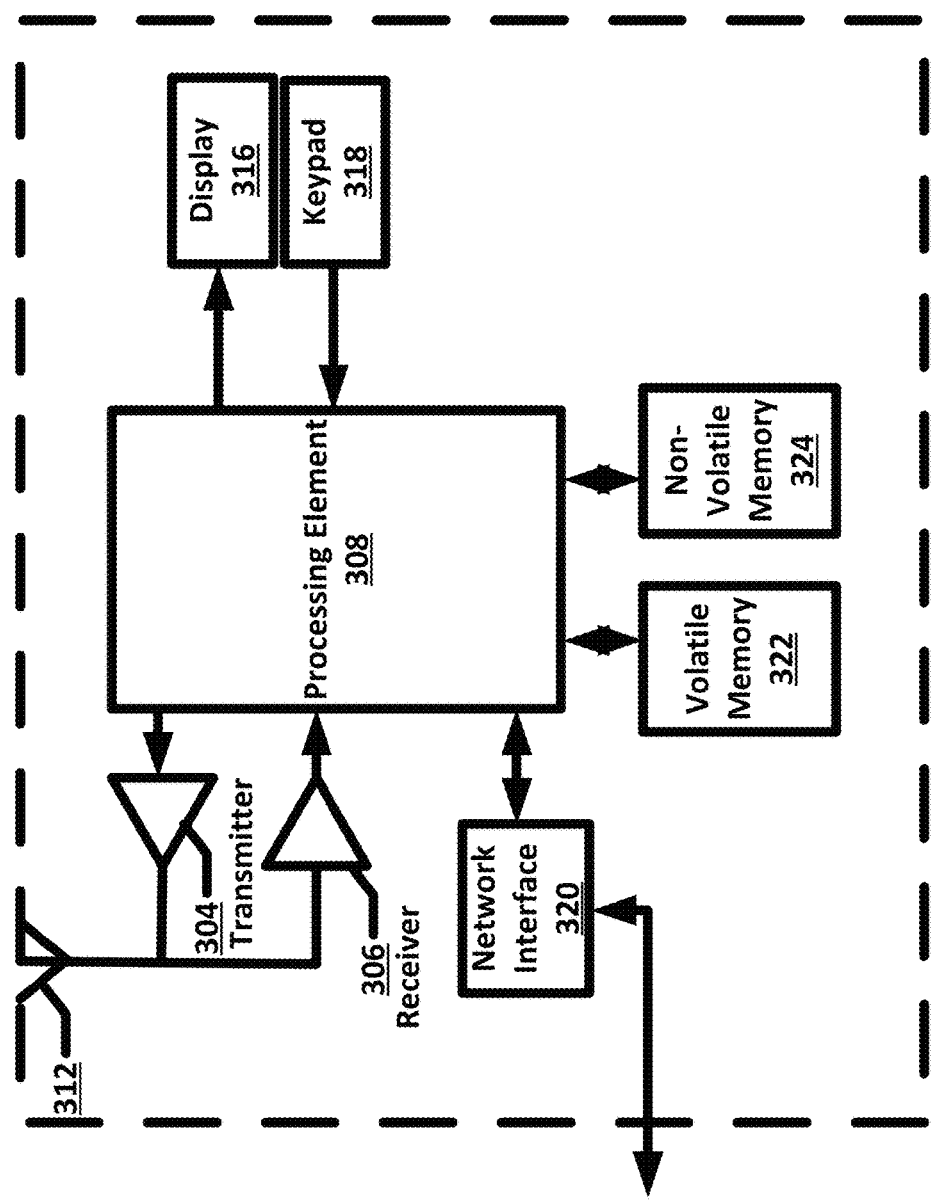

FIG. 3 provides an example client computing entity in accordance with some embodiments discussed herein.

Figure 4:
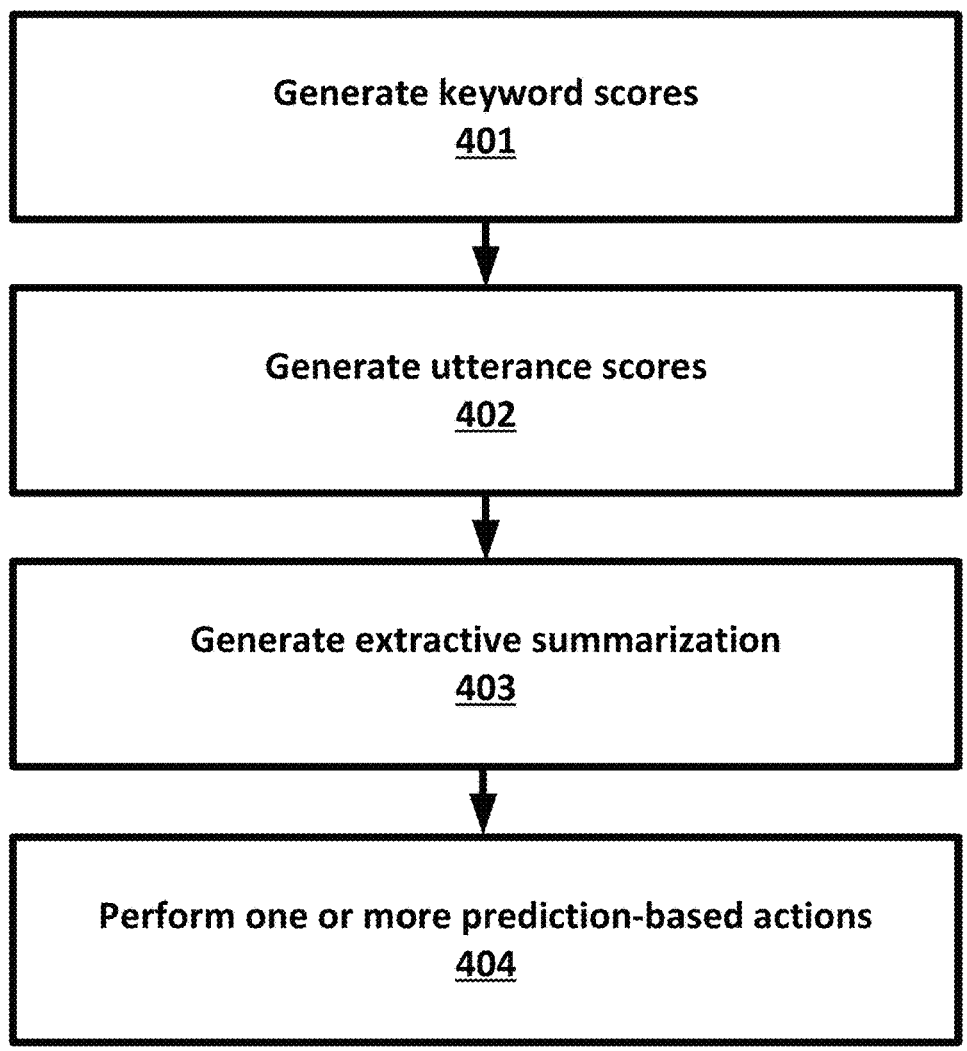

FIG. 4 is a flowchart diagram of an example process for generating an extractive summarization for a multi-party communication transcript data object in accordance with some embodiments discussed herein.

FIG. 5 provides an operational example of a multi-party communication transcript data object in accordance with some embodiments discussed herein.

Figure 6:
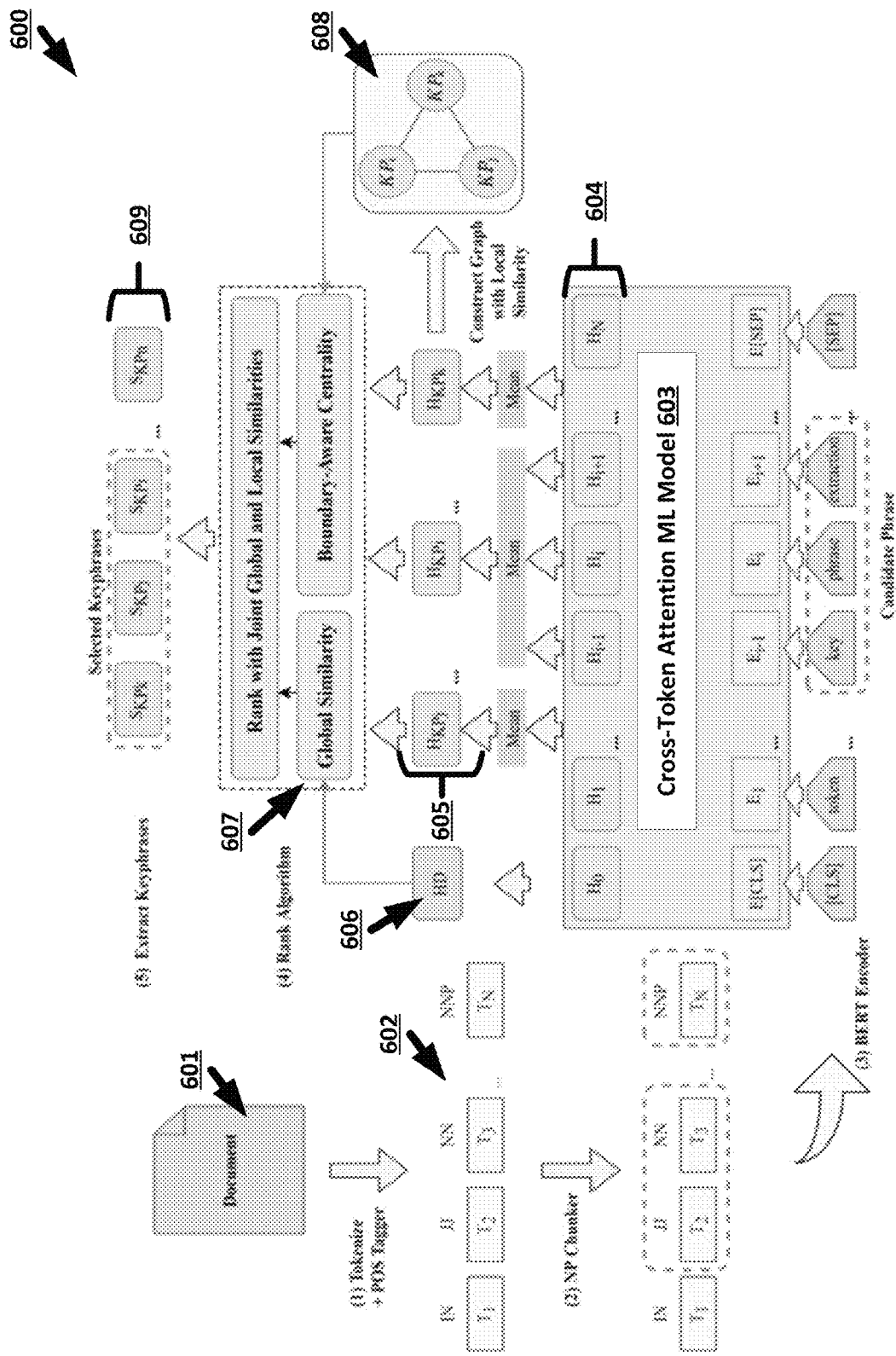

FIG. 6 is a data flow diagram of an example process for generating keyword scores for extracted/inferred candidate keywords of a of a multi-party communication transcript data object in accordance with some embodiments discussed herein.

Figure 7:
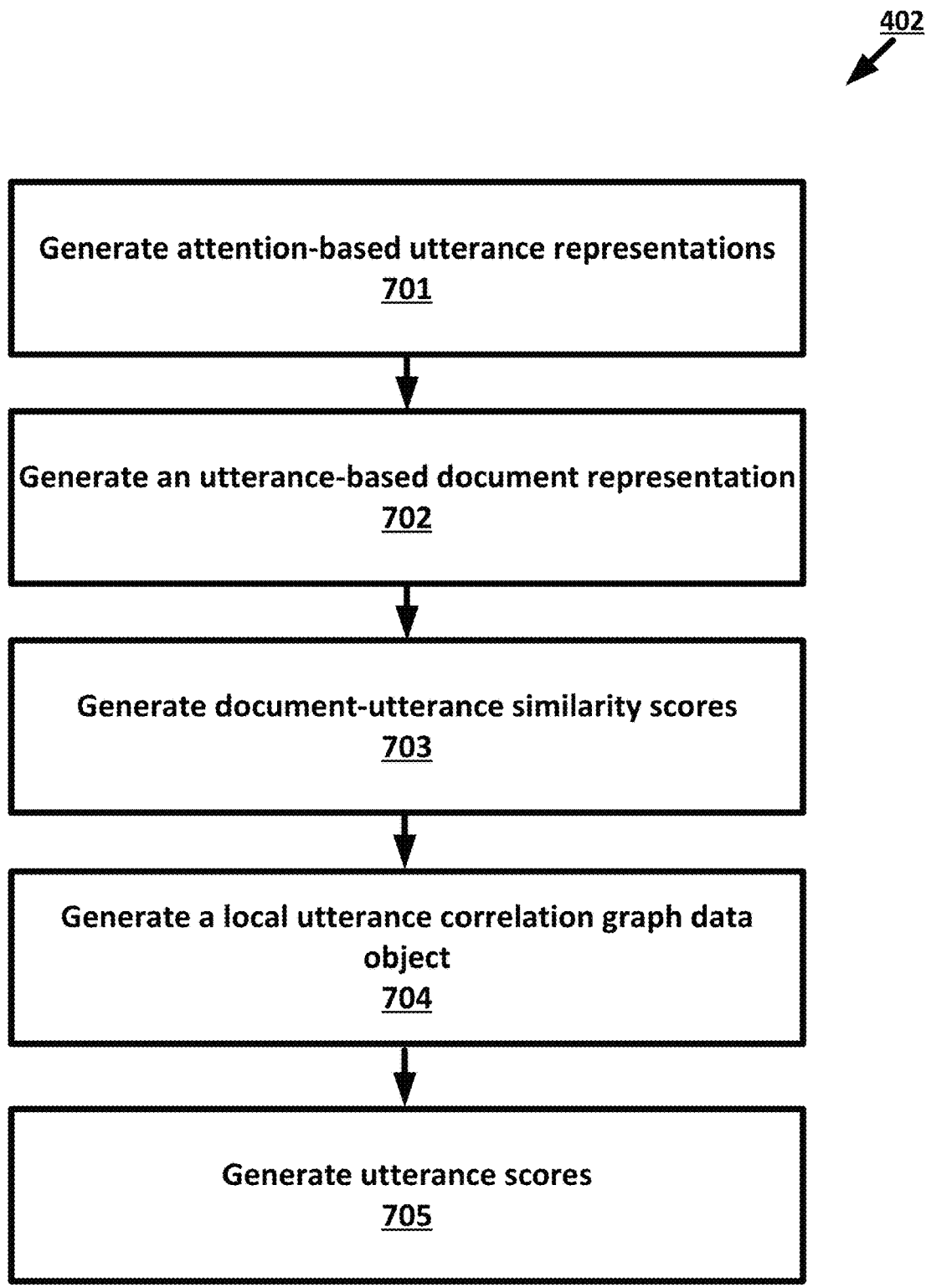

FIG. 7 is a flowchart diagram of an example process for generating utterances scores for utterances of a multi-party communication transcript data object in accordance with some embodiments discussed herein.

Figure 8:
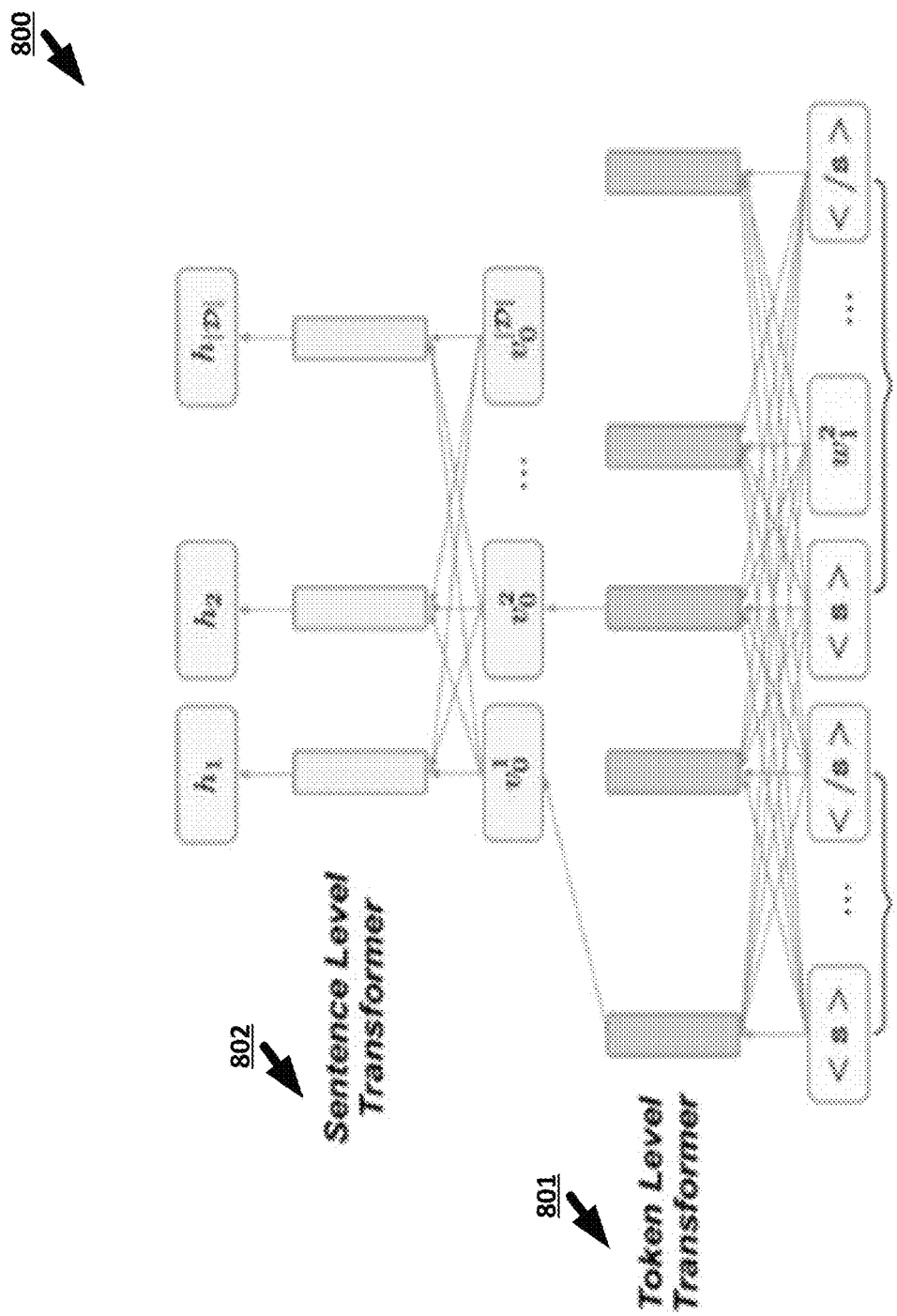

FIG. 8 provides an operational example of a cross-utterance attention machine learning model in accordance with some embodiments discussed herein.

FIG. 9 provides an operational example of a prediction output user interface in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW AND TECHNICAL IMPROVEMENTS

Various embodiments of the present invention disclose techniques for improving storage efficiency of document storage systems. As described herein, various embodiments of the present invention disclose techniques for generating extractive summarizations of document data objects that comprise a selected utterance subset of the utterances of each document data object and a selected keyword subset of the candidate keywords of each document data object. Because an extractive summarization of a document data object is smaller in size than the underlying document data object (as the extractive summarization includes subsets of candidate keywords and utterances described by the document data object), various embodiments of the present invention enable storing extractive summarizations of document data objects instead of the document data objects that are bigger in size. In this way, various embodiments of the present invention reduce storage requirements associated with storing document data, and thus increase storage efficiency of storing document data associated with document data objects. Accordingly, by generating extractive summarizations of document data objects that comprise a selected utterance subset of the utterances of each document data object and a selected keyword subset of the candidate keywords of each document data object, various embodiments of the present invention disclose techniques for improving storage efficiency of various document storage systems.

Furthermore, various embodiments of the present invention make important technical contributions to improving predictive accuracy of natural language processing machine learning models that are configured to perform natural language processing operations on document data objects by using an integer linear programming joint keyword-utterance optimization model that generates a selected utterance subset of the utterances of a document data object and a selected keyword subset of the candidate keywords of the document data object in a manner that is configured to maximize a joint keyword-utterance score for the selected utterance subset and the selected keyword subset given one or more integer linear programming optimization constraints, an approach which in turn improves training speed and training efficiency of training the noted natural language processing machine learning models. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency—Adaptive On-line Training for Fast and Accurate Natural Language Processing* in 40(3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, techniques that improve predictive accuracy without harming training speed, such as the techniques described herein, enable improving training speed given a constant predictive accuracy. In doing so, the techniques described herein improving efficiency and speed of training natural language processing machine learning models, thus reducing the number of computational operations needed and/or the amount of training data entries needed to train natural language processing machine learning models. Accordingly, the techniques described herein improve at least one of the computational efficiency, storage-wise efficiency, and speed of training natural language processing machine learning models.

Moreover, various embodiments of the present invention make important technical contributions to improving resource-usage efficiency of post-prediction systems by using extractive summarizations to set the number of allowed computing entities used by the noted post-prediction systems. For example, in some embodiments, a predictive data analysis computing entity determines D document classifications for D document data objects based at least in part on the D extractive summarizations for the D document data objects. Then, the count of document data objects that are associated with an affirmative document classification, along with a resource utilization ratio for each document data object, can be used to predict a predicted number of computing entities needed to perform post-prediction processing operations (e.g., automated investigation operations) with respect to the D document data objects. For example, in some embodiments, the number of computing entities needed to perform post-prediction processing operations (e.g., automated investigation operations) with respect to D document data objects can be determined based at least in part on the output of the equation:

$$R = \text{ceil}\left(\sum_{k}^{k=K} ur_k\right),$$

where R is the predicted number of computing entities needed to perform post-prediction processing operations with respect to the D document data object, ceil() is a ceiling function that returns the closest integer that is greater than or equal to the value provided as the input parameter of the ceiling function, k is an index variable that iterates over K document data objects among the D document data that are associated with affirmative investigative classifications, and $ur_k$ is the estimated resource utilization ratio for a kth document data object that may be determined based at least in part on a count of utterances/tokens/words in the kth document data object. In some embodiments, once R is generated, the predictive data analysis computing entity can use R to perform operational load balancing for a server system that is configured to perform post-prediction processing operations (e.g., automated investigation operations) with respect to D document data objects. This may be done by allocating computing entities to the post-prediction processing operations if the number of currently allocated computing entities is below R, and deallocating currently allocated computing entities if the number of currently allocated computing entities is above R.

Various embodiments of the present invention relate to generating a call summary by extracting relevant key phrases and relevant key utterances from a transcript document using integer linear programming optimization operations, wherein: (i) the integer linear programming optimization operations are performed based at least in part on utterance ranking scores for utterances of the transcript document and key phrase ranking scores for key phrases of the transcript document, (ii) the utterance ranking scores are generated via processing an utterance relationship graph that is generated using cross-attention weights for utterances using a text graph algorithm that incorporates utterance-document similarity measures as priors, and (iii) the key phrase ranking scores are generated via processing a key phrase relationship graph that is generated using cross-attention weights for key phrases using a text graph algorithm that incorporates phrase-document similarity measures as priors.

II. DEFINITIONS

The term "candidate keyword" may refer to a data construct that describes a collection of one or more text tokens (e.g., words) of a multi-party communication transcript data object (or other document data object), where the candidate keywords may be selected to be included as part of a keyword summary section of an extractive summarization for the multi-party communication transcript data object. Accordingly, each candidate keyword of a multi-party communication transcript data object may be associated with a keyword-related token subset of the text tokens of the multi-party communication transcript data object. For example, if "protected health information" is a candidate keyword of the multi-party communication transcript data object, then the keyword-related token subset for the particular candidate keyword may be the set of text tokens {"protected", "health", "information"}. In some embodiments, the candidate keywords of a multi-party communication transcript data object are generated by combining text tokens of the multi-party communication transcript data object into units based at least in part on keyword generation heuristics. For example, in some embodiments, a keyword generation heuristic may require that, each time a text token that is classified as being a noun by a part-of-speech tagger model follows a text token that is classified as being an adjective by the part-of-speech tagger model, then the combination of the two text tokens is grouped into a candidate keyword. As another example, a keyword generation heuristic may require that each S-sized sequence of consecutively occurring text tokens of a multi-party communication transcript data object is grouped into a respective candidate keyword, where S may be selected a range of one or more size values defined by configuration data for a corresponding summarization framework. For example, if S is selected from the size range {3, 4, 5}, then the set of candidate keywords for a multi-party communication transcript data object includes all of the three-sized sequences of consecutively-occurring text tokens of the multi-party communication transcript data object (e.g., the sequence "significant medical milestone), all of the four-sized sequences of consecutively-occurring text tokens of the multi-party communication transcript data object (e.g., the sequence "very significant medical milestone"), and all of the five-sized sequences of consecutively-occurring text tokens of the multi-party communication transcript data object (e.g., the sequence "early signs of acute prostate cancer" assuming stop words such as "of" are removed prior to candidate keyword generation). As this example illustrates, depending on the set of keyword generation heuristics used, in some embodiments a text token may belong to two or more candidate keywords.

The term "cross-token attention machine learning model" may refer to a data construct that describes parameters, hyperparameters, and/or defined operations of a machine learning model that is configured to generate, for each text token of N text tokens of a multi-party communication transcript data object, an attention-based token representation. In some embodiments, the cross-token attention machine learning model is further configured to: (i) generate a set of N*N token pairs each comprising a pair of text tokens of the N text tokens of the multi-party communication transcript data object, (ii) for each token pair, generate a cross-token self-attention weight (e.g., using a self-attention mechanism), and (ii) generate the attention-based token representation for the text token based at least in part on (e.g., by applying a non-linear function to a linear combination of) each cross-token self-attention weight that is associated with the text token. In some embodiments, during training, the cross-token attention machine learning model is trained using a language modeling task, such as a token making task that comprises: (i) masking a randomly-selected M-sized subset of the N text tokens of a training document data object (e.g., a training multi-party communication transcript data object); (ii) processing initial token representations (e.g., bag of words representations) of the (T−M) non-masked tokens of the training document data object and M masked token representations (e.g., all-zero vector representations) of the masked tokens of the training document data object in accordance with a current state of trainable parameters of the cross-token attention machine learning model to: (a) for each token pair of N*N token pairs that comprises two text tokens (including token pairs that comprise masked text tokens), generate a cross-token self-attention token, (b) for each text token that is in N token pairs and thus is associated with N cross-token self-attention weights, generate an attention-based token representation based at least in part on a linear combination of a vector of the N cross-token self-attention weights for the text token and a vector of the N initial token representations for all of the N text tokens, and (c) predict the M masked tokens of the training document data object based at least in part on the N attention-based token representations for the N text tokens of the training document data object; and updating the trainable parameters of the cross-token attention machine learning model to minimize an error measure describing an estimated/computed error between the predicted M masked tokens and the actual/ground-truth M masked tokens. In this example, it is to be understood that while N may be defined by the size of the training document data object, Mmay be defined by a hyperparameter of the cross-token attention machine learning model.

The term "attention-based token representation" may refer to a data construct that describes a computed/predicted fixed-size representation of a corresponding text token that may be generated based at least in part on cross-token self-attention weights that describes semantic correlation of the corresponding token with other tokens of a corresponding document data object. In some embodiments, once trained and during runtime, the cross-token attention machine learning model uses the resulting trained parameters to process initial token representations (e.g., bag of words representations) of text tokens of an input document data object to generate, for each text token, a respective attention-based token representation. For example, in some embodiments, during runtime, the cross-token machine learning model: (i) receives N input vectors each comprising an initial token representation of N initial token representations for a respective text token of N text tokens of the input document data object, (ii) for each token pair of N token pairs that comprises two text tokens, generates, using the trained parameters resulting from the training operations, an attention-based token representation, and (iii) for each text token that is in N token pairs and thus is associated with N cross-token self-attention weights, generates an attention-based token representation based at least in part on a linear combination of a vector of the N cross-token self-attention weights for the text token and a vector of the N initial token representations for all of the N text tokens. Accordingly, the input to the cross-token attention machine learning model may include a set of N input token representation vectors for the N input tokens of an input document data object, while the output of the cross-token attention machine learning model may include a set of N attention-based token representations for the N input tokens of an input document data object. In this example, it is to be understood that N may be defined by the size of the training document data object.

The term "cross-token self-attention weight" may refer to a data construct that describes a computed/predicted measure of semantic relevance of a first text token of a document data object for a second text token of the document data object. In some embodiments, the cross-token self-attention weights for token pairs are determined based at least in part on the trained parameters of a cross-token attention machine learning model. Accordingly, the cross-token self-attention weights may be dynamically generated values. For example, in some embodiments, during runtime, the cross-token machine learning model: (i) receives N input vectors each comprising an initial token representation of N initial token representations for a respective text token of N text tokens of the input document data object, (ii) for each token pair of N token pairs that comprises two text tokens, generates, using the trained parameters resulting from the training operations, an attention-based token representation, and (iii) for each text token that is in N token pairs and thus is associated with N cross-token self-attention weights, generates an attention-based token representation based at least in part on a linear combination of a vector of the N cross-token self-attention weights for the text token and a vector of the N initial token representations for all of the N text tokens.

The term "token-based keyword representation" may refer to a data construct that describes a fixed-size representation of a corresponding candidate keyword that is generated based at least in part on the attention-based keyword representations that are in the candidate keyword (i.e., that are in the keyword-related token subset for the candidate keyword). In some embodiments, when an ith candidate keyword comprises $N_i$ text tokens and thus $N_i$ attention-based keyword representations, the token-based keyword representation is generated based at least in part on (e.g., by averaging, by concatenating, by processing using one or more trained neural network layers, and/or the like) the $N_i$ attention-based keyword representations. Accordingly, in some embodiments, a token-based keyword representation provides a computed/predicted representation of a corresponding candidate keyword that reflects hidden representations of the text tokens in the corresponding candidate keyword as generated using a cross-token attention mechanism, such as the cross-token attention mechanism described above in relation to a cross-token attention machine learning model.

The term "token-based document representation" may refer to a data construct that describes a fixed-size representation of a multi-party communication transcript data object that is generated based at least in part on all of the attention-based token representations for all of the text tokens of the multi-party communication transcript data object. In some embodiments, given a multi-party communication transcript data object that comprises N text tokens and is thus associated with N attention-based token representations, the token-based document representation is generated based at least in part on (e.g., by performing a max pooling operation on, by averaging, by concatenating, by processing using one or more trained neural network layers, and/or the like) the N attention-based token representations. Accordingly, in some embodiments, a token-based document representation provides a computed/predicted representation of a corresponding document data object that reflects hidden representations of the text tokens in the corresponding document data object as generated using a cross-token attention mechanism, such as the cross-token attention mechanism described above in relation to a cross-token attention machine learning model.

The term "document-keyword similarity score" may refer to a data construct that describes a computed/predicted measure of similarity for a respective candidate keyword with respect to the multi-party communication transcript data object that comprises the respective candidate keyword. In some embodiments, the document-keyword similarity score for a respective candidate keyword is generated based at least in part on a computed/predicted distance measure between a token-based document representation for the multi-party communication transcript data object in which the respective candidate keyword occurs and a token-based keyword representation for the respective candidate keyword. In some embodiments, the document-keyword similarity score for a respective candidate keyword is generated based at least in part on a computed/predicted normalized distance measure between a token-based document representation for the multi-party communication transcript data object in which the respective candidate keyword occurs and a token-based keyword representation for the respective candidate keyword. In some embodiments, the document-keyword similarity score for an ith candidate keyword and a document data object d is generated as the output of the equation $$p(h_i) = \frac{R(h_i)}{\sum_{k=1}^{N} R(h_k)},$$

where: (i) each R ($h_j$) is a non-normalized document-keyword similarity score for the jth candidate keyword of U candidate keywords of d that may be calculated using the output of the equation $$R(h_j) = \frac{1}{\|h_d - h_j\|}$$

(where $h_d$ is the token-based document representation for d and $h_j$ is the token-based keyword representation for the jth candidate keyword of U candidate keywords of d), and (ii) k is an index variable that iterates over the U candidate keywords of d.

The term "local keyword correlation graph data object" may refer to a data construct that describes semantic correlations between candidate keywords of a multi-party communication transcript data object, such as semantic correlations determined based at least in part on cross-token self-attention weights for token pairs of the multi-party communication transcript data object. In some embodiments, the local keyword correlation graph data object for a multi-party communication transcript data object describes a graph having nodes/vertices that correspond to candidate keywords of the multi-party communication transcript data object and edges/links associated with edge/link weights that correspond to semantic correlations between candidate keyword pairs associated with node/vertex pairs of the graph. For example, in some embodiments, given a multi-party communication transcript data object that is associated with K candidate keywords, the local keyword correlation graph data object may comprise: (i) K keyword nodes each associated with a respective keyword of the K candidate keywords, and (ii) up to K*K keyword correlation edges (e.g., K*K keyword correlation edges if the graph is fully connected, less than K*K keyword correlation edges if those keyword correlation edges having a non-threshold-satisfying keyword correlation edge weight are removed from the graph, and/or the like), where each keyword correlation edge is associated with a candidate keyword pair (i.e., a pair of candidate keywords of the K candidate keywords). In some embodiments, given a keyword correlation edge that is associated with a candidate keyword pair comprising a first candidate keyword and a second candidate keyword, the keyword correlation edge for the noted keyword correlation edge is generated by: (i) identifying all token pairs that relate to the keyword correlation edge such that each related token pair comprises a text token that appears in the first candidate keyword and a text token that appears in the second candidate keyword, and (ii) generating the keyword correlation edge for the noted keyword correlation edge based at least in part on (e.g., by performing a max pooling operation on, by averaging, by concatenating, by processing using one or more trained neural network layers, and/or the like) all of the cross-token self-attention weights for the related token pairs identified in (1). For example, in an exemplary embodiment, given a first candidate keyword that comprises $N_1$ text tokens and a second candidate keyword that comprises $N_2$ text tokens, then the two candidate keywords are associated with $N_1 \cdot N_2$ token pairs and thus $N_1 \cdot N_2$ cross-token self-attention weights, which can then be combined (e.g., averaged) to generate the keyword correlation edge weight for the keyword correlation edge that connects the keyword node for the first candidate keyword and the keyword node for the second candidate keyword.

The term "keyword score" may refer to a data construct that describes a computed/predicted semantic/summarization-related significance measure for a respective candidate keyword in a respective multi-party communication transcript data object that is generated based at least in part on the document-keyword similarity score for the candidate keyword and a local keyword correlation graph data object. In some embodiments, to generate the keyword scores for a set of candidate keywords of a multi-party communication transcript data object, the set of candidate keywords are ranked by applying a page rank model/algorithm to the local keyword correlation graph data object associated with the multi-party communication transcript data object, where the prior rankings of the page rank model/algorithm are generated based at least in part on an initial ranking determined in accordance with the document-keyword similarity score for the candidate keyword. In some embodiments, while the keyword correlation edge weights of a local keyword correlation graph data object are generated based at least in part on cross-token attention weights generated using a "local" document-specific model and thus represent more "local" and document-specific measures of semantic significance, the document-keyword similarity scores are generated based at least in part on distance measures generated using keyword representations are thus represent more "global" and cross-document/cross-document-corpus measures of keyword semantic significance, and thus by using both the local keyword correlation graph data object and the document-keyword similarity scores, a proposed solution can use both "local" and "global" predictive inferences in generating keyword scores. In some embodiments, the output of the page rank model/algorithm is a ranking of the candidate keywords, and the keyword score for a candidate keyword is determined based at least in part on the position of the candidate keyword within the ranking (e.g., an inverse of the position of the candidate keyword in a descending ranking, the actual position of the candidate keyword in an ascending ranking, and/or the like).

The term "utterance" may refer to a data construct that describes a collection of one or more text tokens (e.g., words) of a multi-party communication transcript data object (or other document data object) that are determined (e.g., by a sentence detection model, such as a sentence detection model that operates on the output of a part of speech tagger model) to constitute a semantically complete unit. In some embodiments, each utterance of a may be selected to be included as part of a general utterance summary section of an extractive summarization for the multi-party communication transcript data object or a party-specific utterance summary section of an extractive summarization for the multi-party communication transcript data object. In some embodiments, each utterance of a multi-party communication transcript data object is associated with (e.g., is recorded to have been uttered by) a party profile of the P party profiles of the multi-party communication transcript data object. In some embodiments, each utterance of a multi-party communication transcript data object may be associated with an utterance-related token subset of the text tokens of the multi-party communication transcript data object that includes all of the tokens in the utterance. For example, if "can you still hear me?" is an utterance of the multi-party communication transcript data object, then the utterance-related token subset for the particular utterance may be the set of text tokens {"can", "you", "still", "hear", "me"}. In some embodiments, the utterance of a multi-party communication transcript data object is generated by combining text tokens of the multi-party communication transcript data object into units based at least in part on utterance generation heuristics. For example, in some embodiments, an utterance generation heuristic may require that each consecutive sequence of text tokens of a multi-party communication transcript data object that appear between two dot text symbols be categorized as an utterance of the multi-party communication transcript data object.

The term "cross-utterance attention machine learning model" may refer to a data construct that describes parameters, hyperparameters, and/or defined operations of a machine learning model that is configured to generate, for each utterance of a set of utterances of a multi-party communication transcript data object, an attention-based utterance representation using a cross-utterance self-attention mechanism. In some embodiments, given a set of U utterances in a multi-party communication transcript data object that are in turn associated with U respective initial utterance representations (with each utterance being associated with a respective initial utterance representation), the cross-utterance attention machine learning model: (i) for each utterance pair of U*U utterance pairs that comprises two utterances from the multi-party communication transcript data object, generate a cross-utterance self-attention weight based at least in part on the trained parameters of the cross-utterance attention machine learning model, and (ii) for each utterance of the U utterances that is in U utterance pairs and thus is associated with U cross-utterance self-attention weights, generate the attention-based utterance representation for the utterance by applying a non-linear transformation to a linear combination output of a first vector comprising the U initial utterance representations and the U cross-utterance self-attention weights for the U utterance pairs that comprise the particular utterance. In some of the noted embodiments, the cross-utterance attention machine learning model is itself a hierarchical attention machine learning model, such that the U initial utterance representations are themselves generated using a cross-token self-attention mechanism, with each initial utterance representation for an utterance u that comprises $N^u$ text tokens is generated by: (i) receiving $N^u$ initial token representations (e.g., bag of words representations, attention-based token representations generated by the cross-token attention machine learning model, and/or the like) for the $N^u$ text tokens of the utterance u as well as a default token representation, (ii) for each token pair of $N^u*N^u$ token pairs associated with the $N^u$ tokens of the utterance u, generating a cross-token self-attention weight based at least in part on the trained parameters of the cross-utterance attention machine learning model, (iii) for each token of the 1 tokens of the utterance u that is in $N^u$ token pairs and thus is associated with $N^u$ cross-token self-attention weights, generating an attention-based token representation by applying a non-linear transformation to a linear combination output of a first vector of the $N^u$ initial token representations in the utterance u and a second vector of $N^u$ cross-token attention weights for token pairs that comprise the particular token, and (iv) combining the $N^u$ attention-based token representations to generate the initial utterance representation for the utterance u. Examples of hierarchical attention machine learning models are described in Zhang et al., *HIBERT.: Document Level Pre-training of Hierarchical Bidirectional Transformers for Document Summarization* (2019), arXiv:1905.06566v1 [cs.CL], https://doi.org/10.48550/arXiv.1905.06566.

The term "utterance-based document representation" may refer to a data construct that describes a fixed-size representation of a multi-party communication transcript data object that is generated based at least in part on all of the attention-based utterance representations for all of the utterances of the multi-party communication transcript data object. In some embodiments, given a multi-party communication transcript data object that comprises U utterances and is thus associated with U attention-based utterance representations, the utterance-based document representation is generated based at least in part on (e.g., by performing a max pooling operation on, by averaging, by concatenating, by processing using one or more trained neural network layers, and/or the like) the U attention-based utterance representations. Accordingly, in some embodiments, an utterance-based document representation provides a computed/predicted representation of a corresponding document data object that reflects hidden representations of the utterances in the corresponding document data object as generated using a cross-utterance attention mechanism, such as the cross-utterance attention mechanism described above in relation to a cross-utterance attention machine learning model.

The term "local utterance correlation graph data object" may refer to a data construct that describes semantic correlations between utterances of a multi-party communication transcript data object, such as semantic correlations determined based at least in part on cross-utterance self-attention weights for utterance pairs of the multi-party communication transcript data object. In some embodiments, the local utterance correlation graph data object for a multi-party communication transcript data object describes a graph having nodes/vertices that correspond to utterances of the multi-party communication transcript data object and edges/links associated with edge/link weights that correspond to semantic correlations between utterance pairs associated with node/vertex pairs of the graph. For example, in some embodiments, given a multi-party communication transcript data object that is associated with U utterances, the local utterance correlation graph data object may comprise: (i) U utterance nodes each associated with a respective utterance of the U utterances, and (ii) up to U*U utterance correlation edges (e.g., U*U utterance correlation edges if the graph is fully connected, less than U*U utterance correlation edges if those utterance correlation edges having a non-threshold-satisfying utterance correlation edge weight are removed from the graph, and/or the like), where each utterance correlation edge is associated with an utterance pair (i.e., a pair of utterances of the U utterances). In some embodiments, given an utterance correlation edge that is associated with an utterance pair comprising a first utterance and a second utterance, the utterance correlation edge for the noted utterance correlation edge is generated based at least in part on the cross-utterance self-attention weight for the utterance pair as generated by the cross-utterance attention machine learning model.

The term "integer linear programming joint keyword-utterance optimization model" may refer to a data construct that describes parameters, hyperparameters, and/or defined operations of a model that is configured to generate a selected utterance subset of the utterances of the multi-party communication transcript data object and a selected keyword subset of the candidate keywords of the multi-party communication transcript data object in a manner that is configured to maximize a joint keyword-utterance score for the selected utterance subset and the selected keyword subset given one or more integer linear programming optimization constraints. In some embodiments, the integer linear programming optimization constraints of the integer linear programming joint keyword-utterance optimization model comprise at least one of a party utterance summary length constraint requiring that each party utterance summary satisfies an upper-bound party utterance summary length threshold, a keyword-based utterance coverage constraint requiring that, if the selected keyword subset comprises a particular candidate keyword, the selected utterance subset comprises at least one utterance that comprises the particular candidate keyword, an utterance-based keyword coverage constraint requiring that, if the selected utterance subset comprises a particular candidate keyword, the selected keyword subset comprises the particular candidate keyword, an utterance non-emptiness constraint requiring that, for each party profile, the selected utterance subset comprises at least one utterance related to the party profile, a pairwise utterance selection constraint requiring that, if a pairwise utterance similarity score for a cross-party utterance pair comprising a first utterance from a first party profile and a second utterance from a different party profile satisfies a lower-bound pairwise utterance similarity threshold, the selected utterance subset comprises both the first utterance and the second utterance, or a keyword summary length constraint requiring that a selected keyword count of the selected keyword subset satisfies an upper-bound keyword selection count threshold.

The term "joint keyword-utterance score" may refer to a data construct that describes, for the combination of a set of utterances and a set of keywords, a relevance/selection score for the two sets that is generated based at least in part on the utterances scores for the set of utterances and the keyword scores for the set of keywords. For example, given an ith candidate selected keyword subset comprising $K_{si}$ candidate keywords that are associated with $K_{si}$ keyword scores respectively as well as a jth candidate selected utterance subset comprising $U_{sj}$ utterances that are associated with U utterance scores respectively, the joint keyword-utterance score for the combination of the ith candidate selected keyword subset and the a jth candidate selected utterance subset may be generated based at least in part on the $K_{si}$ keyword scores and the $U_{sj}$ utterance scores. In some embodiments, the joint keyword-utterance score for an ith candidate selected keyword subset and a jth candidate selected utterance subset is generated based at least in part on the output of the equation $$JS_{i,j} = \sum_{p=1}^{2} \sum_{u=1}^{U_p} US(U_u^j) * X_u^j + \sum_{k=1}^{K} KS(k) * Y_k.$$

In this equation: (i) p is an index variable that iterates over two (or, in some embodiments, more than two) party profiles of the multi-party communication transcript data object, (ii) u is an index variable that iterates over $U_p$ utterances of the pth party profile, (iii) $U_u^j$ is the uth utterance of the $U_p$ utterances of the pth party profile, (iv) $US(U_u^j)$ is the utterance score (e.g., as determined based at least in part on utterance informativeness and/or ranking) of $U_u^j$ (v) $X_u^j$ is a binary variable that is set to one if $U_u^j$ is part of the jth candidate selected utterance subset and is set to zero otherwise (and is thus different across different utterance sets, allowing the resulting joint keyword-utterance score to change as the utterance sets change), (vi) k is an index variables that iterates over K candidate keywords of the multi-party communication transcript data object, (vi) KS (k) is the keyword score (e.g., as determined based at least in part on the keyword ranking) for the kth candidate keyword of the K candidate keywords of the multi-party communication transcript data object, and (vii) $Y_k$ is a binary variable that is set to one if the kth candidate keyword is part of the ith candidate selected keyword subset and is set to zero otherwise (and is thus different across different keyword sets, allowing the resulting joint keyword-utterance score to change as the keyword sets change).

The term "party utterance summary length constraint" may refer to a data construct that describes an integer linear programming optimization constraint requiring that each party utterance summary satisfies an upper-bound party utterance summary length threshold. In other words, the party utterance summary length constraint requires that, for each party, the number of utterances of the party that are included in the selected utterance subset (and are thus in the party utterance summary for the party) satisfy (e.g., fall below) an upper-bound party utterance summary length threshold (which may be a party-specific value or may be a common value across all parties). In general, any upper-bound threshold described in this application may be satisfied by a value if the value falls below the upper-bound threshold or falls below or is equal to the upper-bound threshold, depending on the embodiment. In some embodiments, the party utterance summary length constraint does not allow selection of a selected utterance subset that comprises a number of utterances of even one-party profile that is above an upper bound threshold. In some embodiments, the party utterance summary length constraint does not allow a selected utterance subset that comprises a number of utterances of even one-party profile that is above or equal to an upper bound threshold.

The term "keyword-based utterance coverage constraint" may refer to a data construct that describes an integer linear programming optimization constraint requiring that, if the selected keyword subset comprises a particular candidate keyword, the selected utterance subset comprises at least one utterance that comprises the particular candidate keyword. In other words, the keyword-based utterance coverage constraint requires that each candidate keyword in the selected keyword subset be included in at least one utterance of the selected utterance subset. Accordingly, given a combination of a candidate selected keyword subset and a candidate selected utterance subset, if the candidate selected keyword subset comprises even one candidate keyword that is not part of any utterances that are in the candidate selected utterance subset, then the combination cannot be selected as the selected keyword subset and the selected utterance subset according to the keyword-based utterance coverage constraint.

The term "utterance-based keyword coverage constraint" may refer to a data construct that describes an integer linear programming optimization constraint requiring that, if the selected utterance subset comprises a particular candidate keyword, the selected keyword subset comprises the particular candidate keyword. In other words, the utterance-based keyword coverage constraint requires that all candidate keywords that appear in utterances of the selected utterance subset be in the selected keyword subset. Accordingly, given a combination of a candidate selected keyword subset and a candidate selected utterance subset, if even one candidate keyword that appears in even one utterance of the candidate selected utterance subset is not part of the candidate selected keyword subset, then the combination cannot be selected as the selected keyword subset and the selected utterance subset according to the utterance-based keyword coverage constraint.

The term "pairwise utterance selection constraint" may refer to a data construct that describes an integer linear programming optimization constraint requiring that, if a pairwise utterance similarity score for (e.g., a cosine similarity score of the respective attention-based utterance representations of) a cross-party utterance pair comprising a first utterance from a first party profile and a second utterance from a different party profile satisfies a lower-bound pairwise utterance similarity threshold, the selected utterance subset comprises both the first utterance and the second utterance. In other words, given a first party profile associated with a multi-party communication transcript data object that is associated with (e.g., is recorded to be the speaker/utterer of) $U^1$ utterances of the multi-party communication transcript data object as well as a second, different party profile associated with the multi-party communication transcript data object that is associated with (e.g., is recorded to be the speaker/utterer of) $U^2$ utterances of the multi-party communication transcript data object, and thus given $U^1*U^2$ cross-party utterance pairs each comprising one of the $U^1$ utterances of the first party profile and one of the $U^2$ utterances of the second party profile, then for each particular cross-party utterance pair that comprises a first utterance of the $U^1$ utterances of the first party profile and a second utterance of the $U^2$ utterances of the second party profile, the following operations are performed: (i) a pairwise utterance similarity score for the particular cross-party utterance pair is generated, for example based at least in part on a similarity score (e.g., a cosine similarity score) between the attention-based utterance representation of the first utterance and the attention-based utterance representation of the second utterance, (ii) a determination is made about whether the pairwise utterance similarity score for the particular cross-party utterance pair satisfies (e.g., falls above, falls above or is equal to, and/or the like) a lower-bound pairwise utterance similarity threshold, and (iii) if the determination at (ii) shows that the pairwise utterance similarity score for the particular cross-party utterance pair satisfies (e.g., falls above, falls above or is equal to, and/or the like) the lower-bound pairwise utterance similarity threshold, then the pairwise utterance selection constraint requires that the first utterance and the second utterance be both added to the selected utterance subset. In general, any lower-bound threshold described in this application may be satisfied by a value if the value falls above the lower-bound threshold or falls above or is equal to the lower-bound threshold, depending on the embodiment.

The term "pairwise lower-bound utterance similarity threshold" may refer to a data construct that describes a statistical distribution measure of pairwise utterance similarity scores for cross-party utterance pairs of a two-party communication transcript data object. In some embodiments, the pairwise lower-bound utterance similarity threshold is generated based at least in part on a deviation measure between: (i) a maximal pairwise utterance similarity score for all cross-party utterance pairs, and (ii) a predefined maximal pairwise utterance similarity score deviation threshold. In other words, given a first party profile associated with a multi-party communication transcript data object that is associated with (e.g., is recorded to be the speaker/utterer of) $U^1$ utterances of the multi-party communication transcript data object as well as a second, different party profile associated with the multi-party communication transcript data object that is associated with (e.g., is recorded to be the speaker/utterer of) $U^2$ utterances of the multi-party communication transcript data object, and thus given $U^1*U^2$ cross-party utterance pairs each comprising one of the $U^1$ utterances of the first party profile and one of the $U^2$ utterances of the second party profile, to generate the pairwise lower-bound utterance similarity threshold the following operations are performed: (i) for each cross-party utterance pair that comprises a first utterance of the $U^1$ utterances of the first party profile and a second utterance of the $U^2$ utterances of the second party profile, a pairwise utterance similarity score is generated, thus resulting in $U^1*U^2$ pairwise utterance similarity scores, (ii) the highest pairwise utterance similarity score of the $U^1*U^2$ pairwise utterance similarity scores is detected, (iii) the pairwise lower-bound utterance similarity threshold is generated based at least in part on the highest pairwise utterance similarity score minus a predefined value known as a predefined maximal pairwise utterance similarity score deviation threshold, which may be defined by configuration data associated with a corresponding predictive data analysis system.

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based at least in part on the generated predictions. An example of a prediction-based action that can be performed using the predictive data analysis system 101 is a request for generating an extractive summarization for a call transcript document.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

A. Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity— relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating with data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

B. Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

As described below, various embodiments of the present invention disclose techniques for improving storage efficiency of document storage systems. As described herein, various embodiments of the present invention disclose techniques for generating extractive summarizations of document data objects that comprise a selected utterance subset of the utterances of each document data object and a selected keyword subset of the candidate keywords of each document data object. Because an extractive summarization of a document data object is smaller in size than the underlying document data object (as the extractive summarization includes subsets of candidate keywords and utterances described by the document data object), various embodiments of the present invention enable storing extractive summarizations of document data objects instead of the document data objects that are bigger in size. In this way, various embodiments of the present invention reduce storage requirements associated with storing document data, and thus increase storage efficiency of storing document data associated with document data objects. Accordingly, by generating extractive summarizations of document data objects that comprise a selected utterance subset of the utterances of each document data object and a selected keyword subset of the candidate keywords of each document data object, various embodiments of the present invention disclose techniques for improving storage efficiency of various document storage systems.

Moreover, as further described below, various embodiments of the present invention make important technical contributions to improving predictive accuracy of natural language processing machine learning models that are configured to perform natural language processing operations on document data objects by using an integer linear programming joint keyword-utterance optimization model that generates a selected utterance subset of the utterances of a document data object and a selected keyword subset of the candidate keywords of the document data object in a manner that is configured to maximize a joint keyword-utterance score for the selected utterance subset and the selected keyword subset given one or more integer linear programming optimization constraints, an approach which in turn improves training speed and training efficiency of training the noted natural language processing machine learning models. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency—Adaptive On-line Training for Fast and Accurate Natural Language Processing* in 40(3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, techniques that improve predictive accuracy without harming training speed, such as the techniques described herein, enable improving training speed given a constant predictive accuracy. In doing so, the techniques described herein improving efficiency and speed of training natural language processing machine learning models, thus reducing the number of computational operations needed and/or the amount of training data entries needed to train natural language processing machine learning models. Accordingly, the techniques described herein improve at least one of the computational efficiency, storage-wise efficiency, and speed of training natural language processing machine learning models.

FIG. 4 is a flowchart diagram of an example process 400 for generating an extractive summarization for a multi-party communication transcript data object that is associated with two party profiles (e.g., a caller party profile and an agent profile). Via the various steps/operations of the process 400, the predictive data analysis computing entity 106 can use a combination of a cross-token attention machine learning, a cross-utterance attention machine learning model, and an integer linear programming joint keyword-utterance optimization model to select an extractive keyword summarization of a multi-party communication transcript data object that comprises a selected utterance subset of U utterances (e.g., U sentences) of the multi-party communication transcript data object and a selected keyword subset of K candidate keywords of the multi-party communication transcript data object.

The process 400 begins at step/operation 401 when the predictive data analysis computing entity 106 generates, for each candidate keyword of the multi-party communication transcript data object, a keyword score. An example of a multi-party communication transcript data object is a call transcript data object, such as a call transcript data object that comprises transcribed text data associated with utterances of two-party profiles (e.g., a party profile associated with a call center agent profile and a party profile associated with a caller/service requester party). An operational example of a multi-party communication transcript data object 500 that comprises utterances from two party profiles associated with two communication parties is depicted in FIG. 5.

In some embodiments, a candidate keyword is a collection of one or more text tokens (e.g., words) of a multi-party communication transcript data object (or other document data object), where the candidate keywords may be selected to be included as part of a keyword summary section of an extractive summarization for the multi-party communication transcript data object. Accordingly, each candidate keyword of a multi-party communication transcript data object may be associated with a keyword-related token subset of the text tokens of the multi-party communication transcript data object. For example, if "protected health information" is a candidate keyword of the multi-party communication transcript data object, then the keyword-related token subset for the particular candidate keyword may be the set of text tokens {"protected", "health", "information"}. In some embodiments, the candidate keywords of a multi-party communication transcript data object are generated by combining text tokens of the multi-party communication transcript data object into units based at least in part on keyword generation heuristics. For example, in some embodiments, a keyword generation heuristic may require that, each time a text token that is classified as being a noun by a part-of-speech tagger model follows a text token that is classified as being an adjective by the part-of-speech tagger model, then the combination of the two text tokens is grouped into a candidate keyword.

As another example, a keyword generation heuristic may require that each S-sized sequence of consecutively occurring text tokens of a multi-party communication transcript data object is grouped into a respective candidate keyword, where S may be selected a range of one or more size values defined by configuration data for a corresponding summarization framework. For example, if S is selected from the size range {3, 4, 5}, then the set of candidate keywords for a multi-party communication transcript data object includes all of the three-sized sequences of consecutively-occurring text tokens of the multi-party communication transcript data object (e.g., the sequence "significant medical milestone), all of the four-sized sequences of consecutively-occurring text tokens of the multi-party communication transcript data object (e.g., the sequence "very significant medical milestone"), and all of the five-sized sequences of consecutively-occurring text tokens of the multi-party communication transcript data object (e.g., the sequence "early signs of acute prostate cancer" assuming stop words such as "of" are removed prior to candidate keyword generation). As this example illustrates, depending on the set of keyword generation heuristics used, in some embodiments a text token may belong to two or more candidate keywords.

In some embodiments, step/operation 401 may be performed in accordance with the process that is depicted in FIG. 6. As depicted in FIG. 6, the depicted process begins when the multi-party communication transcript data object 601 (or other document data object) is "tokenized" to generate a set of N text tokens 602 (e.g., a set of N words) and to assign, to each text token, a part-of-speech tag using a part-of-speech tagger model. Then, the text tokens 602 are combined (e.g., in accordance with a set of keyword generation heuristics) to generate a set of K candidate keywords. Afterward, the N text tokens are processed using a cross-token attention machine learning model 603 to generate, for each text token, an attention-based token representation. Accordingly, the cross-token attention machine learning model 603 is configured to generate N attention-based token representations 604, each being the attention-based token representation for a respective text token of the N text tokens 602.

In some embodiments, a cross-token attention machine learning model is a machine learning model that is configured to generate, for each text token of N text tokens of a multi-party communication transcript data object, an attention-based token representation. In some embodiments, the cross-token attention machine learning model is further configured to: (i) generate a set of N*N token pairs each comprising a pair of text tokens of the N text tokens of the multi-party communication transcript data object, (ii) for each token pair, generate a cross-token self-attention weight (e.g., using a self-attention mechanism), and (ii) generate the attention-based token representation for the text token based at least in part on (e.g., by applying a non-linear function to a linear combination of) each cross-token self-attention weight that is associated with the text token.

In some embodiments, during training, the cross-token attention machine learning model is trained using a language modeling task, such as a token making task that comprises: (i) masking a randomly-selected M-sized subset of the N text tokens of a training document data object (e.g., a training multi-party communication transcript data object); (ii) processing initial token representations (e.g., bag of words representations) of the (T–M) non-masked tokens of the training document data object and M masked token representations (e.g., all-zero vector representations) of the masked tokens of the training document data object in accordance with a current state of trainable parameters of the cross-token attention machine learning model to: (a) for each token pair of N*N token pairs that comprises a pair of text tokens (including token pairs that comprise masked text tokens), generate a cross-token self-attention token, (b) for each text token that is in N token pairs and thus is associated with N cross-token self-attention weights, generate an attention-based token representation based at least in part on a linear combination of a vector of the N cross-token self-attention weights for the text token and a vector of the N initial token representations for all of the N text tokens, and (c) predict the M masked tokens of the training document data object based at least in part on the N attention-based token representations for the N text tokens of the training document data object; and updating the trainable parameters of the cross-token attention machine learning model to minimize an error measure describing an estimated/computed error between the predicted M masked tokens and the actual/ground-truth M masked tokens. In this example, it is to be understood that while N may be defined by the size of the training document data object, M may be defined by a hyperparameter of the cross-token attention machine learning model.

In some embodiments, once trained and during runtime, the cross-token attention machine learning model uses the resulting trained parameters to process initial token representations (e.g., bag of words representations) of text tokens of an input document data object to generate, for each text token, a respective attention-based token representation. For example, in some embodiments, during runtime, the cross-token machine learning model: (i) receives N input vectors each comprising an initial token representation of N initial token representations for a respective text token of N text tokens of the input document data object, (ii) for each token pair of N token pairs that comprises two text tokens, generates, using the trained parameters resulting from the training operations, an attention-based token representation, and (iii) for each text token that is in N token pairs and thus is associated with N cross-token self-attention weights, generates an attention-based token representation based at least in part on a linear combination of a vector of the N cross-token self-attention weights for the text token and a vector of the N initial token representations for all of the N text tokens. Accordingly, the input to the cross-token attention machine learning model may include a set of N input token representation vectors for the N input tokens of an input document data object, while the output of the cross-token attention machine learning model may include a set of N attention-based token representations for the N input tokens of an input document data object. In this example, it is to be understood that N may be defined by the size of the training document data object.

Accordingly, the outputs of a cross-token attention machine learning model may include one or both of attention-based token representations for individual text tokens (e.g., as a final runtime output) and cross-token self-attention weights for token pairs (e.g., as an intermediate token output). In some embodiments, an attention-based token representation describes a computed/predicted fixed-size representation of a corresponding text token that may be generated based at least in part on cross-token self-attention weights that describe relative semantic correlation of the corresponding token with other tokens of a corresponding document data object. In some embodiments, a cross-token self-attention weight describes a computed/predicted measure of semantic relevance of a first text token of a document data object for a second text token of the document data object. In some embodiments, the cross-token self-attention weights for token pairs are determined based at least in part on the trained parameters of a cross-token attention machine learning model. Accordingly, the cross-token self-attention weights may be dynamically generated values.

Returning to FIG. 6, once the N attention-based token representations 604 are generated, the N attention-based token representations 604 are used to generate, for each candidate keyword of the K candidate keywords of the multi-party communication transcript data object, a token-based keyword representation. Accordingly, the N attention-based token representations 604 are used to generate K token-based keyword representations 605, comprising a respective token-based keyword representation for each candidate keyword of the K candidate keywords.

In some embodiments, a token-based keyword representation is a fixed-size representation of a corresponding candidate keyword that is generated based at least in part on the attention-based keyword representations that are in the candidate keyword (i.e., that are in the keyword-related token subset for the candidate keyword). In some embodiments, when an ith candidate keyword comprises N text tokens and thus N attention-based keyword representations, the token-based keyword representation is generated based at least in part on (e.g., by averaging, by concatenating, by processing using one or more trained neural network layers, and/or the like) the N attention-based keyword representations. Accordingly, in some embodiments, a token-based keyword representation provides a computed/predicted representation of a corresponding candidate keyword that reflects hidden representations of the text tokens in the corresponding candidate keyword as generated using a cross-token attention mechanism, such as the cross-token attention mechanism described above in relation to a cross-token attention machine learning model.

Returning to FIG. 6, the predictive data analysis computing entity 106 also generates a token-based document representation 606 for the multi-party communication transcript data object based at least in part on the N attention-based token representations 604. In some embodiments, a token-based document representation is a fixed-size representation of a multi-party communication transcript data object that is generated based at least in part on all of the attention-based token representations for all of the text tokens of the multi-party communication transcript data object. In some embodiments, given a multi-party communication transcript data object that comprises N text tokens and is thus associated with N attention-based token representations, the token-based document representation is generated based at least in part on (e.g., by performing a max pooling operation on, by averaging, by concatenating, by processing using one or more trained neural network layers, and/or the like) the N attention-based token representations. Accordingly, in some embodiments, a token-based document representation provides a computed/predicted representation of a corresponding document data object that reflects hidden representations of the text tokens in the corresponding document data object as generated using a cross-token attention mechanism, such as the cross-token attention mechanism described above in relation to a cross-token attention machine learning model.

Returning to FIG. 6, once the token-based document representation 606 for the multi-party communication transcript data object and the K token-based keyword representations 605 for the K candidate keywords of the multi-party communication transcript data object are generated, the token-based document representation 606 and the K token-based keyword representations 605 are used to generate, for each candidate keyword of the K candidate keywords, a respective document-keyword similarity score. Accordingly, K document-keyword similarity scores 607 are generated, comprising a respective document-keyword similarity score for each candidate keyword of K candidate keywords of the multi-party communication transcript data object.

In some embodiments, a document-keyword similarity score is a computed/predicted measure of similarity for a respective candidate keyword with respect to the multi-party communication transcript data object that comprises the respective candidate keyword. In some embodiments, the document-keyword similarity score for a respective candidate keyword is generated based at least in part on a computed/predicted distance measure between a token-based document representation for the multi-party communication transcript data object in which the respective candidate keyword occurs and a token-based keyword representation for the respective candidate keyword. In some embodiments, the document-keyword similarity score for a respective candidate keyword is generated based at least in part on a computed/predicted normalized distance measure between a token-based document representation for the multi-party communication transcript data object in which the respective candidate keyword occurs and a token-based keyword representation for the respective candidate keyword. In some embodiments, the document-keyword similarity score for an ith candidate keyword and a document data object d is generated as the output of the equation $$p(h_i) = \frac{R(h_i)}{\sum_{k=1}^{K} R(h_k)},$$

where: (i) each $R(h_j)$ is a non-normalized document-keyword similarity score for the jth candidate keyword of U candidate keywords of d that may be calculated using the output of the equation $$R(h_j) = \frac{1}{\|h_d - h_j\|}$$

(where $h_d$ is the token-based document representation for d and $h_j$ is the token-based keyword representation for the jth candidate keyword of U candidate keywords of d), and (ii) k is an index variable that iterates over the K candidate keywords of d.

Returning to FIG. 6, once the cross-token attention machine learning model generates the N*N cross-token self-attention weights for the N*N token pairs of the multi-party communication transcript data object, the predictive data analysis computing entity 106 uses the N*N cross-token self-attention weights to generate a local keyword correlation graph data object 608. In some embodiments, the local keyword correlation graph data object describes semantic correlations between candidate keywords of a multi-party communication transcript data object, such as semantic correlations determined based at least in part on cross-token self-attention weights for token pairs of the multi-party communication transcript data object. In some embodiments, the local keyword correlation graph data object for a multi-party communication transcript data object describes a graph having nodes/vertices that correspond to candidate keywords of the multi-party communication transcript data object and edges/links associated with edge/link weights that correspond to semantic correlations between candidate keyword pairs associated with node/vertex pairs of the graph.

For example, in some embodiments, given a multi-party communication transcript data object that is associated with K candidate keywords, the local keyword correlation graph data object may comprise: (i) K keyword nodes each associated with a respective keyword of the K candidate keywords, and (ii) up to K*K keyword correlation edges (e.g., K*K keyword correlation edges if the graph is fully connected, less than K*K keyword correlation edges if those keyword correlation edges having a non-threshold-satisfying keyword correlation edge weight are removed from the graph, and/or the like), where each keyword correlation edge is associated with a candidate keyword pair (i.e., a pair of candidate keywords of the K candidate keywords). In some embodiments, given a keyword correlation edge that is associated with a candidate keyword pair comprising a first candidate keyword and a second candidate keyword, the keyword correlation edge for the noted keyword correlation edge is generated by: (i) identifying all token pairs that relate to the keyword correlation edge such that each related token pair comprises a text token that appears in the first candidate keyword and a text token that appears in the second candidate keyword, and (ii) generating the keyword correlation edge for the noted keyword correlation edge based at least in part on (e.g., by performing a max pooling operation on, by averaging, by concatenating, by processing using one or more trained neural network layers, and/or the like) all of the cross-token self-attention weights for the related token pairs identified in (1). For example, in an exemplary embodiment, given a first candidate keyword that comprises $N_1$ text tokens and a second candidate keyword that comprises $N_2$ text tokens, then the two candidate keywords are associated with $N_1*N_2$ token pairs and thus $N_1*N_2$ cross-token self-attention weights, which can then be combined (e.g., averaged) to generate the keyword correlation edge weight for the keyword correlation edge that connects the keyword node for the first candidate keyword and the keyword node for the second candidate keyword.

Returning to FIG. 6, once the K document-keyword similarity scores 607 and the local keyword correlation graph data object 608 are generated, the predictive data analysis computing entity 106 generates a keyword score for each candidate keyword based at least in part on the K document-keyword similarity scores 607 and the local keyword correlation graph data object 608. Accordingly, K keyword scores 609 are generated, comprising a respective keyword score for each candidate keyword of the K candidate keywords of the multi-party communication transcript data object.

In some embodiments, a keyword score is a computed/predicted semantic/summarization-related significance measure for a respective candidate keyword in a respective multi-party communication transcript data object that is generated based at least in part on the document-keyword similarity score for the candidate keyword and a local keyword correlation graph data object. In some embodiments, to generate the keyword scores for a set of candidate keywords of a multi-party communication transcript data object, the set of candidate keywords are ranked by applying a page rank model/algorithm to the local keyword correlation graph data object associated with the multi-party communication transcript data object, where the prior rankings of the page rank model/algorithm are generated based at least in part on an initial ranking determined in accordance with the document-keyword similarity score for the candidate keyword. In some embodiments, while the keyword correlation edge weights of a local keyword correlation graph data object are generated based at least in part on cross-token attention weights generated using a "local" document-specific model and thus represent more "local" and document-specific measures of semantic significance, the document-keyword similarity scores are generated based at least in part on distance measures generated using keyword representations are thus represent more "global" and cross-document/cross-document-corpus measures of keyword semantic significance, and thus by using both the local keyword correlation graph data object and the document-keyword similarity scores, a proposed solution can use both "local" and "global" predictive inferences in generating keyword scores. In some embodiments, the output of the page rank model/algorithm is a ranking of the candidate keywords, and the keyword score for a candidate keyword is determined based at least in part on the position of the candidate keyword within the ranking (e.g., an inverse of the position of the candidate keyword in a descending ranking, the actual position of the candidate keyword in an ascending ranking, and/or the like).

In some embodiments, once the K keyword scores 609 for the K candidate keywords of the multi-party communication transcript data object are generated, then a refined/filtered subset of the K candidate keywords is selected based at least in part on the K keyword scores. For example, the top A candidate keywords that have the top A keyword scores may be selected, the top B percentage of the candidate keywords that have the top B percent keyword scores may be selected, or the candidate keywords whose keyword scores satisfy (e.g., fall above) a lower-bound keyword score threshold may be selected (where all three of A, B, and C may be defined by configuration hyperparameter data for the predictive data analysis system 101). In some embodiments, once the refined/filtered subset of the K candidate keywords is selected, the candidate keywords that fall outside of this refined/filtered subset are removed, such that the set of candidate keywords is updated to include only the candidate keywords in the refined/filtered subset, and K is updated to reflect the size of the refined/filtered subset. In some embodiments, when this keyword refinement/filtering is performed, then the integer linear programing optimization constraints of the integer linear programming joint keyword-utterance optimization model do not need to include a keyword summary length constraint requiring that a selected keyword count of the selected keyword subset satisfies an upper-bound keyword selection count threshold (e.g., that the number of selected candidate keywords falls below a particular upper-limit threshold count), as thresholding the count of candidate keywords in the selected keyword subset may be performed before the integer linear programming operations of the integer linear programming joint keyword-utterance optimization model. However, in some embodiments, even when the above-described keyword refinement/selection is performed to refine the set of K candidate keywords based at least in part on the keyword scores and update K, the integer linear programing optimization constraint is still required to select a subset of this refined set of set of K candidate keywords, and thus in some embodiments integer linear programing optimization constraints of the integer linear programming joint keyword-utterance optimization model include a keyword summary length constraint requiring that a selected keyword count of the selected keyword subset satisfies an upper-bound keyword selection count threshold.

Moreover, as described above, in some embodiments, step/operation 401 may be performed without performing the linear integer programming operations of the integer linear programming joint keyword-utterance optimization model. In some of those embodiments, once the K keyword scores 609 for the K candidate keywords of the multi-party communication transcript data object are generated, then a refined/filtered subset of the K candidate keywords is selected based at least in part on the K keyword scores, and the refined/filtered subset is presented as a selected keyword subset that is part of an extractive summarization of a target document data object. In some embodiments, the extractive summarization of the target document data object comprises a ranked list of the refined/filtered subset as generated based at least in part on a descending ranking of keyword scores for the candidate keywords in the refined/filtered subset.

Returning to FIG. 4, at step/operation 402, the predictive data analysis computing entity 106 generates, for each utterance of U utterances of the multi-party communication transcript data object, an utterance score. An example of an utterance is a sentence of the multi-party communication transcript data object.

In some embodiments, an utterance is a collection of one or more text tokens (e.g., words) of a multi-party communication transcript data object (or other document data object) that are determined (e.g., by a sentence detection model, such as a sentence detection model that operates on the output of a part of speech tagger model) to constitute a semantically complete unit. In some embodiments, each utterance of a multi-party communication transcript data object may be selected to be included as part of a general utterance summary section of an extractive summarization for the multi-party communication transcript data object or a party-specific utterance summary section of an extractive summarization for the multi-party communication transcript data object. In some embodiments, each utterance of a multi-party communication transcript data object is associated with (e.g., is recorded to have been uttered by) a party profile of the P party profiles of the multi-party communication transcript data object. In some embodiments, each utterance of a multi-party communication transcript data object may be associated with an utterance-related token subset of the text tokens of the multi-party communication transcript data object that includes all of the tokens in the utterance. For example, if "can you still hear me?" is an utterance of the multi-party communication transcript data object, then the utterance-related token subset for the particular utterance may be the set of text tokens {"can", "you", "still", "hear", "me"}. In some embodiments, the utterance of a multi-party communication transcript data object is generated by combining text tokens of the multi-party communication transcript data object into units based at least in part on utterance generation heuristics. For example, in some embodiments, an utterance generation heuristic may require that each consecutive sequence of text tokens of a multi-party communication transcript data object that appear between two dot text symbols be categorized as an utterance of the multi-party communication transcript data object.

In some embodiments, step/operation 402 may be performed in accordance with the process that is depicted in FIG. 7, which is an example process for generating U utterance scores comprising a respective utterance score for each utterance of U utterances of a multi-party communication transcript data object. The process that is depicted in FIG. 7 begins at step/operation 701 when the predictive data analysis computing entity 106 generates, for each utterance, an attention-based utterance representation. In some embodiments, to generate the U attention-based utterance representations for the U utterances of the multi-party communication transcript data object, the predictive data analysis computing entity 106 uses a cross-utterance attention machine learning model.

In some embodiments, a cross-utterance attention machine learning model is configured to generate, for each utterance of a set of utterances of a multi-party communication transcript data object, an attention-based utterance representation using a cross-utterance self-attention mechanism. In some embodiments, given a set of U utterances in a multi-party communication transcript data object that are in turn associated with U respective initial utterance representations (with each utterance being associated with a respective initial utterance representation), the cross-utterance attention machine learning model: (i) for each utterance pair of U*U utterance pairs that comprises two utterances from the multi-party communication transcript data object, generate a cross-utterance self-attention weight based at least in part on the trained parameters of the cross-utterance attention machine learning model, and (ii) for each utterance of the U utterances that is in U utterance pairs and thus is associated with U cross-utterance self-attention weights, generate the attention-based utterance representation for the utterance by applying a non-linear transformation to a linear combination output of a first vector comprising the U initial utterance representations and the U cross-utterance self-attention weights for the U utterance pairs that comprise the particular utterance. In some of the noted embodiments, the cross-utterance attention machine learning model is itself a hierarchical attention machine learning model, such that the U initial utterance representations are themselves generated using a cross-token self-attention mechanism, with each initial utterance representation for an utterance u that comprises $N^u$ text tokens is generated by: (i) receiving N initial token representations (e.g., bag of words representations, attention-based token representations generated by the cross-token attention machine learning model, and/or the like) for the $N^u$ text tokens of the utterance u as well as a default token representation, (ii) for each token pair of $N^u*N^u$ token pairs associated with the $N^u$ tokens of the utterance u, generating a cross-token self-attention weight based at least in part on the trained parameters of the cross-utterance attention machine learning model, (iii) for each token of the $N^u$ tokens of the utterance u that is in $N^u$ token pairs and thus is associated with $N^u$ cross-token self-attention weights, generating an attention-based token representation by applying a non-linear transformation to a linear combination output of a first vector of the $N^u$ initial token representations in the utterance u and a second vector of $N^u$ cross-token attention weights for token pairs that comprise the particular token, and (iv) combining the $N^u$ attention-based token representations to generate the initial utterance representation for the utterance u. Examples of hierarchical attention machine learning models are described in Zhang et al., *HIBERT. Document Level Pre-training of Hierarchical Bidirectional Transformers for Document Summarization* (2019), arXiv:1905.06566v1 [cs.CL], https://doi.org/10.48550/arXiv.1905.06566.

In some embodiments, the initial utterance representations used by a cross-utterance attention machine learning model are generated using mechanisms other than the hierarchical attention mechanisms described above. For example, in some embodiments, given an utterance that includes a set of text tokens, the initial utterance representation for the utterance is generated based at least in part on (e.g., by averaging, by concatenating, by processing using one or more trained neural network layers, and/or the like) the attention-based token representations for the set of text tokens as generated by a cross-token attention machine learning model. As another example, in some embodiments, given an utterance that includes a set of text tokens, the initial utterance representation for the utterance is generated based at least in part on (e.g., by averaging, by concatenating, by processing using one or more trained neural network layers, and/or the like) bag of words representations for the set of text tokens as generated by a cross-token attention machine learning model. As yet another example, in some embodiments, given an utterance that includes a set of text tokens, the initial utterance representation for the utterance is generated based at least in part on (e.g., by averaging, by concatenating, by processing using one or more trained neural network layers, and/or the like) one-hot-coded representations for the set of text tokens as generated by a cross-token attention machine learning model.

In both hierarchical and non-hierarchical architectures, the cross-utterance attention machine learning model may be trained using a language modeling task, such as an utterance masking task that comprises: (i) masking a randomly-selected subset of J utterances from U utterances of a training document data object, (ii) generating attention-based utterance representations for the U-J non-masked utterances using a current state of trainable parameters of the cross-utterance attention machine learning model, (iii) predicting the J masked utterances based at least in part on the U-J attention-based utterance hidden representations for the U-J non-masked utterances, (iv) updating trainable parameters of the cross-utterance attention machine learning model to minimize an error measure that is determined based at least in part on a deviation of the predicted masked utterances with the real/ground truth masked utterances.

In some embodiments, inputs to the cross-utterance attention machine learning model include N vectors comprising N initial token representations for N text tokens of an input document data object. In some embodiments, inputs to the cross-utterance attention machine learning model include U vectors comprising U initial utterance representations for U utterances of an input document data object. In some embodiments, outputs of the cross-utterance attention machine learning model comprise U vectors comprising U attention-based utterances representations for U utterances of an input document data object.

An operational example of a cross-utterance attention machine learning model 800 that has a hierarchical architecture is depicted in FIG. 8. As depicted in FIG. 8, the cross-utterance attention machine learning model 800 comprises a token-level transformer 801 that is configured to: (i) generate, for each text token of an utterance, an attention-based token representation, and (ii) generate, for the utterance and based at least in part on the attention-based token representations for the text tokens of the utterance, an initial utterance representation. As further depicted in FIG. 8, the cross-utterance attention machine learning model 800 further comprises an utterance/sentence level transformer 802 that is configured to generate, for each utterance of the input document data object, an attention-based utterance representation based at least in part on initial utterance representations generated by the token-level transformer 801.

Returning to FIG. 7, at step/operation 702, the predictive data analysis computing entity 106 generates an utterance-based document representation for the multi-party communication transcript data object based at least in part on the U attention-based utterance representations for the U utterances of the multi-party communication transcript data object. In some embodiments, an utterance-based document representation is a fixed-size representation of a multi-party communication transcript data object that is generated based at least in part on all of the attention-based utterance representations for all of the utterances of the multi-party communication transcript data object. In some embodiments, given a multi-party communication transcript data object that comprises U utterances and is thus associated with U attention-based utterance representations, the utterance-based document representation is generated based at least in part on (e.g., by performing a max pooling operation on, by averaging, by concatenating, by processing using one or more trained neural network layers, and/or the like) the U attention-based utterance representations. Accordingly, in some embodiments, an utterance-based document representation provides a computed/predicted representation of a corresponding document data object that reflects hidden representations of the utterances in the corresponding document data object as generated using a cross-utterance attention mechanism, such as the cross-utterance attention mechanism described above in relation to a cross-utterance attention machine learning model.

At step/operation 703, the predictive data analysis computing entity 106 generates, for each utterance of the U utterances of the multi-party communication transcript data object, a document-utterance similarity score. N utterance of N utterances of d. In some embodiments, a document-utterance similarity score is a computed/predicted measure of similarity for a respective utterance with respect to the multi-party communication transcript data object that comprises the respective utterance. In some embodiments, the document-utterance similarity score for a respective utterance is generated based at least in part on a computed/predicted distance measure between an utterance-based document representation for the multi-party communication transcript data object in which the respective utterance occurs and an attention-based utterance representation for the respective utterance. In some embodiments, the document-utterance similarity score for a respective utterance is generated based at least in part on a computed/predicted normalized distance measure between an utterance-based document representation for the multi-party communication transcript data object in which the respective utterance occurs and an attention-based utterance representation for the respective utterance. In some embodiments, the document-utterance similarity score for an ith utterance and a document data object d is generated as the output of the equation $$pu(h_i) = \frac{Ru(h_i)}{\sum_{u=1}^{U} Ru(h_u)},$$

where: (i) each $Ru(h_j)$ is a non-normalized document-utterance similarity score for the jth utterance of U utterances of d that may be calculated using the output of the equation $$Ru(h_j) = \frac{1}{\left\| h^d - h^j \right\|}$$

(where $h^d$ is the utterance-based document representation for d and $h^j$ is the attention-based utterance representation for the jth utterance of U utterances of d), and (ii) u is an index variable that iterates over the U utterances of d.

At step/operation 704, the predictive data analysis computing entity 106 generates a local utterance correlation graph data object. In some embodiments, the local utterance correlation graph data object describes semantic correlations between utterances of a multi-party communication transcript data object, such as semantic correlations determined based at least in part on cross-utterance self-attention weights for utterance pairs of the multi-party communication transcript data object. In some embodiments, the local utterance correlation graph data object for a multi-party communication transcript data object describes a graph having nodes/vertices that correspond to utterances of the multi-party communication transcript data object and edges/links associated with edge/link weights that correspond to semantic correlations between utterance pairs associated with node/vertex pairs of the graph. For example, in some embodiments, given a multi-party communication transcript data object that is associated with U utterances, the local utterance correlation graph data object may comprise: (i) U utterance nodes each associated with a respective utterance of the U utterances, and (ii) up to U*U utterance correlation edges (e.g., U*U utterance correlation edges if the graph is fully connected, less than U*U utterance correlation edges if those utterance correlation edges having a non-threshold-satisfying utterance correlation edge weight are removed from the graph, and/or the like), where each utterance correlation edge is associated with an utterance pair (i.e., a pair of utterances of the U utterances). In some embodiments, given an utterance correlation edge that is associated with an utterance pair comprising a first utterance and a second utterance, the utterance correlation edge for the noted utterance correlation edge is generated based at least in part on the cross-utterance self-attention weight for the utterance pair as generated by the cross-utterance attention machine learning model.

As described above, in some embodiments, the outputs of a cross-utterance attention machine learning model may include one or both of attention-based utterance representations for individual utterances (e.g., as a final runtime output) and cross-utterance self-attention weights for utterance pairs (e.g., as an intermediate utterance output). In some embodiments, an attention-based utterance representation describes a computed/predicted fixed-size representation of a corresponding utterance that may be generated based at least in part on cross-utterance self-attention weights that describe relative semantic correlation of the corresponding utterance with other utterances of a corresponding document data object. In some embodiments, a cross-utterance self-attention weight describes a computed/predicted measure of semantic relevance of a first utterance of a document data object for a second utterance of the document data object. In some embodiments, the cross-utterance self-attention weights for utterance pairs are determined based at least in part on the trained parameters of a cross-utterance attention machine learning model. Accordingly, the cross-utterance self-attention weights may be dynamically generated values.

At step/operation 705, the predictive data analysis computing entity 106 generates an utterance score for each utterance based at least in part on the U document-utterance similarity scores and the local utterance correlation graph data object. Accordingly, U utterance scores are generated, comprising a respective utterance score for each utterance of the U utterances of the multi-party communication transcript data object.

In some embodiments, an utterance score is a computed/predicted semantic/summarization-related significance measure for a respective utterance in a respective multi-party communication transcript data object that is generated based at least in part on the document-utterance similarity score for the utterance and a local utterance correlation graph data object. In some embodiments, to generate the utterance scores for a set of utterances of a multi-party communication transcript data object, the set of utterances are ranked by applying a page rank model/algorithm to the local utterance correlation graph data object associated with the multi-party communication transcript data object, where the prior rankings of the page rank model/algorithm are generated based at least in part on an initial ranking determined in accordance with the document-utterance similarity score for the utterance. In some embodiments, while the utterance correlation edge weights of a local utterance correlation graph data object are generated based at least in part on cross-utterances attention weights generated using a "local" document-specific model and thus represent more "local" and document-specific measures of semantic significance, the document-utterance similarity scores are generated based at least in part on distance measures generated using utterance representations are thus represent more "global" and cross-document/cross-document-corpus measures of utterance semantic significance, and thus by using both the local utterance correlation graph data object and the document-utterance similarity scores, a proposed solution can use both "local" and "global" predictive inferences in generating utterance scores. In some embodiments, the output of the page rank model/algorithm is a ranking of the utterances, and the utterance score for an utterance is determined based at least in part on the position of the utterance within the ranking (e.g., an inverse of the position of the utterance in a descending ranking, the actual position of the utterance in an ascending ranking, and/or the like).

In some embodiments, once the U utterance scores for the U utterances of the multi-party communication transcript data object are generated, then a refined/filtered subset of the U utterances is selected based at least in part on the U utterance scores. For example, the top A utterances that have the top A utterance scores may be selected, the top B percentage of the utterances that have the top B percent utterance scores may be selected, or the utterances whose utterance scores satisfy (e.g., fall above) a lower-bound utterance score threshold may be selected (where all three of A, B, and C may be defined by configuration hyperparameter data for the predictive data analysis system 101). In some embodiments, once the refined/filtered subset of the U utterances is selected, the utterances that fall outside of this refined/filtered subset are removed, such that the set of utterances is updated to include only the utterances in the refined/filtered subset, and U is updated to reflect the size of the refined/filtered subset.

Moreover, as described above, in some embodiments, step/operation 402 may be performed without performing the linear integer programming operations of the integer linear programming joint keyword-utterance optimization model. In some of those embodiments, once the U utterance scores for the U utterances of the multi-party communication transcript data object are generated, then a refined/filtered subset of the U utterances is selected based at least in part on the U utterance scores, and the refined/filtered subset is presented as a selected utterance subset that is part of an extractive summarization of a target document data object. In some embodiments, the extractive summarization of the target document data object comprises a ranked list of the refined/filtered subset as generated based at least in part on a descending ranking of utterance scores for the utterances in the refined/filtered subset.

Returning to FIG. 4, at step/operation 403, the predictive data analysis computing entity 106 generates the extractive summarization based at least in part on the K keyword scores for the K candidate keywords of the multi-party communication transcript data object (e.g., the original K candidate keywords, the refined/filtered K candidate keywords, and/or the like) and the U utterance scores for the U utterances of the multi-party communication transcript data object (e.g., the original U utterances, the refined/filtered U utterances, and/or the like). In some embodiments, the predictive data analysis computing entity 106 processes the K keyword scores and the U utterance scores for a multi-party communication transcript data object using an integer linear programming joint keyword-utterance optimization model that is configured to generate a selected utterance subset of the U utterances of the multi-party communication transcript data object and a selected keyword subset of the K candidate keywords of the multi-party communication transcript data object in a manner that is configured to maximize a joint keyword-utterance score for the selected utterance subset and the selected keyword subset given one or more integer linear programming optimization constraints. In some embodiments, the integer linear programming optimization constraints of the integer linear programming joint keyword-utterance optimization model comprise at least one of a party utterance summary length constraint requiring that each party utterance summary satisfies an upper-bound party utterance summary length threshold, a keyword-based utterance coverage constraint requiring that, if the selected keyword subset comprises a particular candidate keyword, the selected utterance subset comprises at least one utterance that comprises the particular candidate keyword, an utterance-based keyword coverage constraint requiring that, if the selected utterance subset comprises a particular candidate keyword, the selected keyword subset comprises the particular candidate keyword, an utterance non-emptiness constraint requiring that, for each party profile, the selected utterance subset comprises at least one utterance related to the party profile, a pairwise utterance selection constraint requiring that, if a pairwise utterance similarity score for a cross-party utterance pair comprising a first utterance from a first party profile and a second utterance from a different party profile satisfies a lower-bound pairwise utterance similarity threshold, the selected utterance subset comprises both the first utterance and the second utterance, or a keyword summary length constraint requiring that a selected keyword count of the selected keyword subset satisfies an upper-bound keyword selection count threshold.

In some embodiments, the integer linear programming joint keyword-utterance optimization model uses integer linear programming operations to generate/select a selected utterance subset of the set of all utterances in a document data object and a selected keyword subset of the set of all candidate keywords in the document data object in a manner that optimizes (e.g., maximizes) an optimization measure given a set of optimization measures. The optimization measure may be a joint keyword-utterance score for the combination of the selected utterance subset and the selected keyword subset. In some embodiments, a joint keyword-utterance score for the combination of a set of utterances and a set of keywords may be a relevance/selection score for the two sets that is generated based at least in part on the utterances scores for the set of utterances and the keyword scores for the set of keywords. For example, given an ith candidate selected keyword subset comprising $K_{si}$ candidate keywords that are associated with $K_{si}$ keyword scores respectively as well as a jth candidate selected utterance subset comprising $U_{sj}$ utterances that are associated with U utterance scores respectively, the joint keyword-utterance score for the combination of the ith candidate selected keyword subset and the a jth candidate selected utterance subset may be generated based at least in part on the $K_{si}$ keyword scores and the $U_{sj}$ utterance scores.

In some embodiments, the joint keyword-utterance score for an ith candidate selected keyword subset and a jth candidate selected utterance subset is generated based at least in part on the output of the equation $$JS_{i,j} = \sum_{p=1}^{2} \sum_{u=1}^{U_p} US(U_u^j) * X_u^j + \sum_{k=1}^{K} KS(k) * Y_k.$$

In this equation: (i) p is an index variable that iterates over two (or, in some embodiments, more than two) party profiles of the multi-party communication transcript data object, (ii) u is an index variable that iterates over $U_p$ utterances of the pth party profile, (iii) $U_u^h$ is the uth utterance of the $U_p$ utterances of the pth party profile, (iv) $US(U_u^j)$ is the utterance score (e.g., as determined based at least in part on utterance informativeness and/or ranking) of $U_u^j$, (v) $X_u^j$ is a binary variable that is set to one if $U_u^j$ is part of the jth candidate selected utterance subset and is set to zero otherwise (and is thus different across different utterance sets, allowing the resulting joint keyword-utterance score to change as the utterance sets change), (vi) k is an index variables that iterates over K candidate keywords of the multi-party communication transcript data object, (vi) KS(k) is the keyword score (e.g., as determined based at least in part on the keyword ranking) for the kth candidate keyword of the K candidate keywords of the multi-party communication transcript data object, and (vii) $Y_k$ is a binary variable that is set to one if the kth candidate keyword is part of the ith candidate selected keyword subset and is set to zero otherwise (and is thus different across different keyword sets, allowing the resulting joint keyword-utterance score to change as the keyword sets change).

In some embodiments, to generate the selected keyword subset and the selected utterance subset for a multi-party communication transcript data object, the integer linear programming joint keyword-utterance optimization model: (i) identifies a set of candidate selected keyword subsets and a set of candidate selected utterance subsets, (ii) for each subset pair comprising a respective candidate selected keyword subset and a respective candidate selected utterance subset that satisfies the defined integer linear programming optimization operations, generates a joint keyword-utterance score, (iii) selects the subset pair that satisfies the defined integer linear programming optimization operations and that has the highest joint keyword-utterance score, and (iv) sets the candidate selected keyword subset in the selected subset pair as the output selected keyword subset and the candidate selected utterance subset in the selected subset pair as the output selected utterance subset. In some embodiments, to generate the selected keyword subset and the selected utterance subset for a multi-party communication transcript data object, the integer linear programming joint keyword-utterance optimization model selects the values for the X and Y indicator variables/functions in the above equation for generating the joint keyword-utterance score to maximize the joint keyword-utterance score while observing a set of defined integer linear programming optimization constraints.

In some embodiments, the integer linear programming optimization constraints comprise a party utterance summary length constraint requiring that each party utterance summary satisfies an upper-bound party utterance summary length threshold. In other words, the party utterance summary length constraint requires that, for each party, the number of utterances of the party that are included in the selected utterance subset (and are thus in the party utterance summary for the party) satisfy (e.g., fall below) an upper-bound party utterance summary length threshold (which may be a party-specific value or may be a common value across all parties). In general, any upper-bound threshold described in this application may be satisfied by a value if the value falls below the upper-bound threshold or falls below or is equal to the upper-bound threshold, depending on the embodiment. In some embodiments, the party utterance summary length constraint does not allow selection of a selected utterance subset that comprises a number of utterances of even one-party profile that is above an upper bound threshold. In some embodiments, the party utterance summary length constraint does not allow a selected utterance subset that comprises a number of utterances of even one-party profile that is above or equal to an upper bound threshold.

In some embodiments, the integer linear programming optimization constraints comprise a keyword-based utterance coverage constraint requiring that, if the selected keyword subset comprises a particular candidate keyword, the selected utterance subset comprises at least one utterance that comprises the particular candidate keyword. In other words, the keyword-based utterance coverage constraint requires that each candidate keyword in the selected keyword subset be included in at least one utterance of the selected utterance subset. Accordingly, given a combination of a candidate selected keyword subset and a candidate selected utterance subset, if the candidate selected keyword subset comprises even one candidate keyword that is not part of any utterances that are in the candidate selected utterance subset, then the combination cannot be selected as the selected keyword subset and the selected utterance subset according to the keyword-based utterance coverage constraint.

In some embodiments, the integer linear programming optimization constraints comprise an utterance-based keyword coverage constraint requiring that, if the selected utterance subset comprises a particular candidate keyword, the selected keyword subset comprises the particular candidate keyword. In other words, the utterance-based keyword coverage constraint requires that all candidate keywords that appear in utterances of the selected utterance subset be in the selected keyword subset. Accordingly, given a combination of a candidate selected keyword subset and a candidate selected utterance subset, if even one candidate keyword that appears in even one utterance of the candidate selected utterance subset is not part of the candidate selected keyword subset, then the combination cannot be selected as the selected keyword subset and the selected utterance subset according to the utterance-based keyword coverage constraint.

In some embodiments, the integer linear programming optimization constraints comprise a pairwise utterance selection constraint requiring that, if a pairwise utterance similarity score for (e.g., a cosine similarity score of the respective attention-based utterance representations of) a cross-party utterance pair comprising a first utterance from a first party profile and a second utterance from a different party profile satisfies a lower-bound pairwise utterance similarity threshold, the selected utterance subset comprises both the first utterance and the second utterance. In other words, given a first party profile associated with a multi-party communication transcript data object that is associated with (e.g., is recorded to be the speaker/utterer of) $U^1$ utterances of the multi-party communication transcript data object as well as a second, different party profile associated with the multi-party communication transcript data object that is associated with (e.g., is recorded to be the speaker/utterer of) $U^2$ utterances of the multi-party communication transcript data object, and thus given $U^1*U^2$ cross-party utterance pairs each comprising one of the $U^1$ utterances of the first party profile and one of the $U^2$ utterances of the second party profile, then for each particular cross-party utterance pair that comprises a first utterance of the $U^1$ utterances of the first party profile and a second utterance of the $U^2$ utterances of the second party profile, the following operations are performed: (i) a pairwise utterance similarity score for the particular cross-party utterance pair is generated, for example based at least in part on a similarity score (e.g., a cosine similarity score) between the attention-based utterance representation of the first utterance and the attention-based utterance representation of the second utterance, (ii) a determination is made about whether the pairwise utterance similarity score for the particular cross-party utterance pair satisfies (e.g., falls above, falls above or is equal to, and/or the like) a lower-bound pairwise utterance similarity threshold, and (iii) if the determination at (ii) shows that the pairwise utterance similarity score for the particular cross-party utterance pair satisfies (e.g., falls above, falls above or is equal to, and/or the like) the lower-bound pairwise utterance similarity threshold, then the pairwise utterance selection constraint requires that the first utterance and the second utterance be both added to the selected utterance subset. In general, any lower-bound threshold described in this application may be satisfied by a value if the value falls above the lower-bound threshold or falls above or is equal to the lower-bound threshold, depending on the embodiment.

In some embodiments, the pairwise lower-bound utterance similarity threshold is generated based at least in part on a deviation measure between: (i) a maximal pairwise utterance similarity score for all cross-party utterance pairs, and (ii) a predefined maximal pairwise utterance similarity score deviation threshold. In other words, given a first party profile associated with a multi-party communication transcript data object that is associated with (e.g., is recorded to be the speaker/utterer of) $U^1$ utterances of the multi-party communication transcript data object as well as a second, different party profile associated with the multi-party communication transcript data object that is associated with (e.g., is recorded to be the speaker/utterer of) $U^2$ utterances of the multi-party communication transcript data object, and thus given $U^1*U^2$ cross-party utterance pairs each comprising one of the $U^1$ utterances of the first party profile and one of the $U^2$ utterances of the second party profile, to generate the pairwise lower-bound utterance similarity threshold the following operations are performed: (i) for each cross-party utterance pair that comprises a first utterance of the $U^1$ utterances of the first party profile and a second utterance of the $U^2$ utterances of the second party profile, a pairwise utterance similarity score is generated, thus resulting in $U^1*U^2$ pairwise utterance similarity scores, (ii) the highest pairwise utterance similarity score of the $U^1*U^2$ pairwise utterance similarity scores is detected, (iii) the pairwise lower-bound utterance similarity threshold is generated based at least in part on the highest pairwise utterance similarity score minus a predefined value known as a predefined maximal pairwise utterance similarity score deviation threshold, which may be defined by configuration data associated with a corresponding predictive data analysis system.

Returning to FIG. 4, at step/operation 404, the predictive data analysis computing entity 106 performs one or more prediction-based actions based at least in part on the extractive summarization. In some embodiments, performing the prediction-based actions comprises generating display data for a prediction output user interface, such as the prediction output user interface 900 of FIG. 9 that displays the extractive summarization for the multi-party communication transcript data object 500 of FIG. 5.

Other examples of prediction-based actions include performing operational load balancing for post-prediction systems by using extractive summarizations to set the number of allowed computing entities used by the noted post-prediction systems. For example, in some embodiments, a predictive data analysis computing entity determines D document classifications for D document data objects based at least in part on the D extractive summarizations for the D document data objects. Then, the count of document data objects that are associated with an affirmative document classification, along with a resource utilization ratio for each document data object, can be used to predict a predicted number of computing entities needed to perform post-prediction processing operations (e.g., automated investigation operations) with respect to the D document data objects. For example, in some embodiments, the number of computing entities needed to perform post-prediction processing operations (e.g., automated investigation operations) with respect to D document data objects can be determined based at least in part on the output of the equation:

$$R = \text{ceil}\left(\sum_{k}^{k=K} ur_k\right),$$

where R is me predicted number of computing entities needed to perform post-prediction processing operations with respect to the D document data object, cello) is a ceiling function that returns the closest integer that is greater than or equal to the value provided as the input parameter of the ceiling function, k is an index variable that iterates over K document data objects among the D document data that are associated with affirmative investigative classifications, and $ur_k$ is the estimated resource utilization ratio for a kth document data object that may be determined based at least in part on a count of utterances/tokens/words in the kth document data object. In some embodiments, once R is generated, the predictive data analysis computing entity can use R to perform operational load balancing for a server system that is configured to perform post-prediction processing operations (e.g., automated investigation operations) with respect to D document data objects. This may be done by allocating computing entities to the post-prediction processing operations if the number of currently allocated computing entities is below R, and deallocating currently allocated computing entities if the number of currently allocated computing entities is above R.

As described above, FIG. 4 depicts an exemplary process 400 for generating an extractive summarization for a multi-party communication transcript data object that is associated with two party profiles (e.g., a caller party profile and an agent profile). However, while various embodiments of the present invention describe techniques for generating an extractive summarization for a multi-party communication transcript data object that is associated with two party profiles, a person of ordinary skill in the relevant technology will recognize that various embodiments of the present invention can be used to generate an extractive summarization of any document data object, including a multi-party communication transcript that is associated with three or more party profiles.

For example, in some embodiments, step/operation 401 can be used to generate a keyword-based extractive summarization of any document data object that comprises a selected keyword subset of the K candidate keywords of the particular document data object as selected based at least in part on the keyword scores for the K candidate keywords, step/operation 402 can be used to generate an utterance-based extractive summarization of any document data object that comprises a selected utterance subset for the U utterances of the particular document data object as selected based at least in part on the keyword scores for the U utterances, or the combination of steps/operations 401-402 can be used to generate an extractive summarization of any document data object that comprises both the keyword-based extractive summarization of the particular document data object and the utterance-based extractive summarization of the particular document data object.

As another example, in some embodiments, once keyword scores and utterances scores are generated using steps/operations 401-402 respectively, the integer linear programming optimizations of step/operation 403 may be performed without using any integer linear programming optimization constraints that are defined based at least in part on constraint conditions that are specific to multi-party communication transcript data objects to generate an extractive summarization of any document data object that comprises the selected keyword subset of the K candidate keywords in the particular document data object and the selected utterance subset of the U utterances in the particular document data object. In an exemplary embodiments, once keyword scores and utterances scores are generated using steps/operations 401-402 respectively, the integer linear programming joint keyword-utterance optimization model may generate the selected keyword subset and the selected utterance subset based at least in part on the keyword scores and utterances scores and using a set of integer linear programming optimization operations that comprise at least one of the keyword-based utterance coverage constraint, the utterance-based keyword coverage constraint, the keyword summary length constraint, or a utterance summary length constraint that requires that a count of utterances in the selected utterance subset (i.e., a selected utterance count of the selected utterance subset) satisfies (e.g., falls below, falls below or is equal to, and/or the like) an upper-bound utterance summary length threshold.

As yet another example, in some embodiments, once keyword scores and utterances scores are generated using steps/operations 401-402 respectively, the integer linear programming optimizations of step/operation 403 may be performed without using any integer linear programming optimization constraints that are defined based at least in part on constraint conditions that are specific to two-party communication transcript data objects to generate an extractive summarization of any multi-party communication transcript data object that comprises the selected keyword subset of the K candidate keywords in the particular multi-party communication transcript data object and the selected utterance subset of the U utterances in the particular multi-party communication transcript data object. In an exemplary embodiments, once keyword scores and utterances scores are generated using steps/operations 401-402 respectively, the integer linear programming joint keyword-utterance optimization model may generate the selected keyword subset and the selected utterance subset based at least in part on the keyword scores and utterances scores and using a set of integer linear programming optimization operations that comprise at least one of the upper-bound party utterance summary length threshold, the keyword-based utterance coverage constraint, the utterance-based keyword coverage constraint, the utterance non-emptiness constraint, the keyword summary length constraint, or an P-tuple-wise utterance selection constraint requiring that, if a tuple-wise utterance similarity score for a cross-party utterance P-tuple comprising an utterance from each party of P party profiles of the multi-party communication transcript data object satisfies (e.g., is above, is above or equal to, and/or the like) a lower-bound tuple-wise utterance similarity threshold, the selected utterance subset comprise all of the P utterances in the cross-party utterance P-tuple. In some of the noted embodiments, the tuple-wise lower-bound utterance similarity threshold is generated based at least in part on a deviation measure between: (i) a maximal tuple-wise utterance similarity score for all cross-party utterance P-tuples, and (ii) a predefined maximal tuple-wise utterance similarity score deviation threshold.

Accordingly, as described above, various embodiments of the present invention disclose techniques for improving storage efficiency of document storage systems. As described herein, various embodiments of the present invention disclose techniques for generating extractive summarizations of document data objects that comprise a selected utterance subset of the utterances of each document data object and a selected keyword subset of the candidate keywords of each document data object. Because an extractive summarization of a document data object is smaller in size than the underlying document data object (as the extractive summarization includes subsets of candidate keywords and utterances described by the document data object), various embodiments of the present invention enable storing extractive summarizations of document data objects instead of the document data objects that are bigger in size. In this way, various embodiments of the present invention reduce storage requirements associated with storing document data, and thus increase storage efficiency of storing document data associated with document data objects. Accordingly, by generating extractive summarizations of document data objects that comprise a selected utterance subset of the utterances of each document data object and a selected keyword subset of the candidate keywords of each document data object, various embodiments of the present invention disclose techniques for improving storage efficiency of various document storage systems.

Moreover, as further described above, various embodiments of the present invention make important technical contributions to improving predictive accuracy of natural language processing machine learning models that are configured to perform natural language processing operations on document data objects by using an integer linear programming joint keyword-utterance optimization model that generates a selected utterance subset of the utterances of a document data object and a selected keyword subset of the candidate keywords of the document data object in a manner that is configured to maximize a joint keyword-utterance score for the selected utterance subset and the selected keyword subset given one or more integer linear programming optimization constraints, an approach which in turn improves training speed and training efficiency of training the noted natural language processing machine learning models. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency—Adaptive On-line Training for Fast and Accurate Natural Language Processing* in 40(3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, techniques that improve predictive accuracy without harming training speed, such as the techniques described herein, enable improving training speed given a constant predictive accuracy. In doing so, the techniques described herein improving efficiency and speed of training natural language processing machine learning models, thus reducing the number of computational operations needed and/or the amount of training data entries needed to train natural language processing machine learning models. Accordingly, the techniques described herein improve at least one of the computational efficiency, storage-wise efficiency, and speed of training natural language processing machine learning models.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for generating an extractive summarization for a document data object, the computer-implemented comprising:
    identifying, by one or more processors, a plurality of utterances associated with the document data object;
    for each utterance, by the one or more processors:
        generating, using a cross-utterance attention machine learning model, an attention-based utterance representation, wherein the cross-utterance attention machine learning model is configured to: (i) for each utterance pair, generate a cross-utterance self-attention weight, and (ii) generate the attention-based utterance representation for the utterance based at least in part on each cross-utterance self-attention weight that is associated with the utterance,
        generating, based at least in part on the attention-based utterance representation and an utterance-based document representation that is generated based at least in part on each attention-based utterance representation, a document-utterance similarity score for the utterance, and
        generating, based at least in part on a local utterance correlation graph data object and the document-utterance similarity score for the utterance, an utterance score for the utterance, wherein each utterance correlation edge of the local utterance correlation graph data object corresponds to a respective utterance pair and is associated with an utterance correlation edge weight that is generated based at least in part on the cross-utterance self-attention weight for the respective utterance pair;
    generating, by the one or more processors, the extractive summarization based at least in part on each utterance score; and
    performing, by the one or more processors, one or more prediction-based actions based at least in part on each utterance score.

2. The computer-implemented method of claim 1, wherein generating the extractive summarization based at least in part on each utterance score comprises:
    identifying a plurality of candidate keywords associated with the document data object, wherein each candidate keyword is associated with a keyword-related token subset of a group of text tokens in the document data object;
    for each text token of the group of text tokens, generating, using a cross-token attention machine learning model, an attention-based token representation, wherein the cross-token attention machine learning model is further configured to generate: (i) for each token pair, a cross-token self-attention weight, and (ii) generate the attention-based token representation for the text token based at least in part on each cross-token self-attention weight that is associated with the text token;
    for each candidate keyword:
        generating, based at least in part on each attention-based token representation for the keyword-related token subset for the candidate keyword, a token-based keyword representation for the candidate keyword,
        generating, based at least in part on the token-based keyword representation and a token-based document representation that is generated based at least in part on each attention-based token representation, a document-keyword similarity score for the candidate keyword, and
        generating, based at least in part on a local keyword correlation graph data object and the document-keyword similarity score for the candidate keyword, a keyword score for the candidate keyword, wherein each keyword correlation edge of the local keyword correlation graph data object corresponds to a respective candidate keyword pair and is associated with a keyword correlation edge weight that is generated based at least in part on each cross-token self-attention weight for the respective candidate keyword pair; and
    generating the extractive summarization based at least in part on each utterance score and each keyword score.

3. The computer-implemented method of claim 2, wherein:
    the document data object is a multi-party communication transcript data object that is associated with a plurality of party profiles, and generating the extractive summarization based at least in part on each utterance score and each keyword score further comprises:
    generating, using an integer linear programming joint keyword-utterance optimization model and based at least in part on each utterance score and each keyword score, a selected utterance subset of the plurality of utterances and a selected keyword subset of the plurality of candidate keywords, wherein: (i) the selected utterance subset comprises a party utterance summary for each party profile of the plurality of party profiles, (ii) the integer linear programming joint keyword-utterance optimization model is configured to generate the selected utterance subset and the selected keyword subset to maximize a joint keyword-utterance score for the selected utterance subset and the selected keyword subset given one or more integer linear programming optimization constraints, and (iii) the one or more integer linear programming optimization constraints comprise a party utterance summary length constraint requiring that each party utterance summary satisfies an upper-bound party utterance summary length threshold, and
    generating the extractive summarization based at least in part on the selected utterance subset and the selected keyword subset.

4. The computer-implemented method of claim 3, wherein the one or more integer linear programming optimization constraints comprise a keyword-based utterance coverage constraint requiring that, if the selected keyword subset comprises a particular candidate keyword, the selected utterance subset comprises at least one utterance that comprises the particular candidate keyword.

5. The computer-implemented method of claim 3, wherein the one or more integer linear programming optimization constraints comprise an utterance-based keyword coverage constraint requiring that, if the selected utterance subset comprises a particular candidate keyword, the selected keyword subset comprises the particular candidate keyword.

6. The computer-implemented method of claim 3, wherein the one or more integer linear programming optimization constraints comprise an utterance non-emptiness constraint requiring that, for each party profile of the plurality of party profiles, the selected utterance subset comprises at least one utterance related to the party profile.

7. The computer-implemented method of claim 3, wherein the one or more integer linear programming optimization constraints comprise a pairwise utterance selection constraint requiring that, if a pairwise utterance similarity score for a cross-party utterance pair comprising a first utterance from a first party profile and a second utterance from a different party profile satisfies a lower-bound pairwise utterance similarity threshold, the selected utterance subset comprises both the first utterance and the second utterance.

8. The computer-implemented method of claim 7, wherein the lower-bound pairwise utterance similarity threshold is generated based at least in part on a deviation measure between: (i) a maximal pairwise utterance similarity score for all cross-party utterance pairs, and (ii) a predefined maximal pairwise utterance similarity score deviation threshold.

9. The computer-implemented method of claim 3, wherein the one or more integer linear programming optimization constraints comprise a keyword summary length constraint requiring that a selected keyword count of the selected keyword subset satisfies an upper-bound keyword selection count threshold.

10. An apparatus for generating an extractive summarization for a document data object, the apparatus comprising one or more processors and at least one memory including program code, the at least one memory and the program code configured to, with the one or more processors, cause the apparatus to:
    identify a plurality of utterances associated with the document data object;
    for each utterance:
        generate, using a cross-utterance attention machine learning model, an attention-based utterance representation, wherein the cross-utterance attention machine learning model is configured to: (i) for each utterance pair, generate a cross-utterance self-attention weight, and (ii) generate the attention-based utterance representation for the utterance based at least in part on each cross-utterance self-attention weight that is associated with the utterance,
        generate, based at least in part on the attention-based utterance representation and an utterance-based document representation that is generated based at least in part on each attention-based utterance representation, a document-utterance similarity score for the utterance, and
        generate, based at least in part on a local utterance correlation graph data object and the document-utterance similarity score for the utterance, an utterance score for the utterance, wherein each utterance correlation edge of the local utterance correlation graph data object corresponds to a respective utterance pair and is associated with an utterance correlation edge weight that is generated based at least in part on the cross-utterance self-attention weight for the respective utterance pair;
    generate the extractive summarization based at least in part on each utterance score; and
    perform one or more prediction-based actions based at least in part on each utterance score.

11. The apparatus of claim 10, wherein generating the extractive summarization based at least in part on each utterance score comprises:
    identifying a plurality of candidate keywords associated with the document data object, wherein each candidate keyword is associated with a keyword-related token subset of a group of text tokens in the document data object;
    for each text token of the group of text tokens, generating, using a cross-token attention machine learning model, an attention-based token representation, wherein the cross-token attention machine learning model is further configured to generate: (i) for each token pair, a cross-token self-attention weight, and
    (ii) generate the attention-based token representation for the text token based at least in part on each cross-token self-attention weight that is associated with the text token;
    for each candidate keyword:
        generating, based at least in part on each attention-based token representation for the keyword-related token subset for the candidate keyword, a token-based keyword representation for the candidate keyword,
        generating, based at least in part on the token-based keyword representation and a token-based document representation that is generated based at least in part on each attention-based token representation, a document-keyword similarity score for the candidate keyword, and generating, based at least in part on a local keyword correlation graph data object and the document-keyword similarity score for the candidate keyword, a keyword score for the candidate keyword, wherein each keyword correlation edge of the local keyword correlation graph data object corresponds to a respective candidate keyword pair and is associated with a keyword correlation edge weight that is generated based at least in part on each cross-token self-attention weight for the respective candidate keyword pair; and generating the extractive summarization based at least in part on each utterance score and each keyword score.

12. The apparatus of claim 11, wherein:

the document data object is a multi-party communication transcript data object that is associated with a plurality of party profiles, and generating the extractive summarization based at least in part on each utterance score and each keyword score further comprises:

generating, using an integer linear programming joint keyword-utterance optimization model and based at least in part on each utterance score and each keyword score, a selected utterance subset of the plurality of utterances and a selected keyword subset of the plurality of candidate keywords, wherein: (i) the selected utterance subset comprises a party utterance summary for each party profile of the plurality of party profiles, (ii) the integer linear programming joint keyword-utterance optimization model is configured to generate the selected utterance subset and the selected keyword subset to maximize a joint keyword-utterance score for the selected utterance subset and the selected keyword subset given one or more integer linear programming optimization constraints, and (iii) the one or more integer linear programming optimization constraints comprise a party utterance summary length constraint requiring that each party utterance summary satisfies an upper-bound party utterance summary length threshold, and generating the extractive summarization based at least in part on the selected utterance subset and the selected keyword subset.

13. The apparatus of claim 12, wherein the one or more integer linear programming optimization constraints comprise a keyword-based utterance coverage constraint requiring that, if the selected keyword subset comprises a particular candidate keyword, the selected utterance subset comprises at least one utterance that comprises the particular candidate keyword.

14. The apparatus of claim 12, wherein the one or more integer linear programming optimization constraints comprise an utterance-based keyword coverage constraint requiring that, if the selected utterance subset comprises a particular candidate keyword, the selected keyword subset comprises the particular candidate keyword.

15. The apparatus of claim 12, wherein the one or more integer linear programming optimization constraints comprise an utterance non-emptiness constraint requiring that, for each party profile of the plurality of party profiles, the selected utterance subset comprises at least one utterance related to the party profile.

16. The apparatus of claim 12, wherein the one or more integer linear programming optimization constraints comprise a pairwise utterance selection constraint requiring that, if a pairwise utterance similarity score for a cross-party utterance pair comprising a first utterance from a first party profile and a second utterance from a different party profile satisfies a lower-bound pairwise utterance similarity threshold, the selected utterance subset comprises both the first utterance and the second utterance.

17. The apparatus of claim 16, wherein the lower-bound pairwise utterance similarity threshold is generated based at least in part on a deviation measure between: (i) a maximal pairwise utterance similarity score for all cross-party utterance pairs, and (ii) a predefined maximal pairwise utterance similarity score deviation threshold.

18. A computer program product for generating an extractive summarization for a document data object, the computer program product comprising at least one non-transitory computer-readable storage medium having computer-readable program code portions stored therein, the computer-readable program code portions configured to:

identify a plurality of utterances associated with the document data object;

for each utterance:

generate, using a cross-utterance attention machine learning model, an attention-based utterance representation, wherein the cross-utterance attention machine learning model is configured to: (i) for each utterance pair, generate a cross-utterance self-attention weight, and (ii) generate the attention-based utterance representation for the utterance based at least in part on each cross-utterance self-attention weight that is associated with the utterance, generate, based at least in part on the attention-based utterance representation and an utterance-based document representation that is generated based at least in part on each attention-based utterance representation, a document-utterance similarity score for the utterance, and generate, based at least in part on a local utterance correlation graph data object and the document-utterance similarity score for the utterance, an utterance score for the utterance, wherein each utterance correlation edge of the local utterance correlation graph data object corresponds to a respective utterance pair and is associated with an utterance correlation edge weight that is generated based at least in part on the cross-utterance self-attention weight for the respective utterance pair;

generate the extractive summarization based at least in part on each utterance score; and perform one or more prediction-based actions based at least in part on each utterance score.

19. The computer program product of claim 18, wherein generating the extractive summarization based at least in part on each utterance score comprises:

identifying a plurality of candidate keywords associated with the document data object, wherein each candidate keyword is associated with a keyword-related token subset of a group of text tokens in the document data object;

for each text token of the group of text tokens, generating, using a cross-token attention machine learning model, an attention-based token representation, wherein the cross-token attention machine learning model is further configured to generate: (i) for each token pair, a cross-token self-attention weight, and (ii) generate the attention-based token representation for the text token based at least in part on each cross-token self-attention weight that is associated with the text token;

for each candidate keyword:

generating, based at least in part on each attention-based token representation for the keyword-related token subset for the candidate keyword, a token-based keyword representation for the candidate keyword, generating, based at least in part on the token-based keyword representation and a token-based document representation that is generated based at least in part on each attention-based token representation, a document-keyword similarity score for the candidate keyword, and generating, based at least in part on a local keyword correlation graph data object and the document-keyword similarity score for the candidate keyword, a keyword score for the candidate keyword, wherein each keyword correlation edge of the local keyword correlation graph data object corresponds to a respective candidate keyword pair and is associated with a keyword correlation edge weight that is generated based at least in part on each cross-token self-attention weight for the respective candidate keyword pair; and generating the extractive summarization based at least in part on each utterance score and each keyword score.

20. The computer program product of claim 19, wherein:
the document data object is a multi-party communication transcript data object that is associated with a plurality of party profiles, and
generating the extractive summarization based at least in part on each utterance score and each keyword score further comprises:
generating, using an integer linear programming joint keyword-utterance optimization model and based at least in part on each utterance score and each keyword score, a selected utterance subset of the plurality of utterances and a selected keyword subset of the plurality of candidate keywords, wherein: (i) the selected utterance subset comprises a party utterance summary for each party profile of the plurality of party profiles, (ii) the integer linear programming joint keyword-utterance optimization model is configured to generate the selected utterance subset and the selected keyword subset to maximize a joint keyword-utterance score for the selected utterance subset and the selected keyword subset given one or more integer linear programming optimization constraints, and (iii) the one or more integer linear programming optimization constraints comprise a party utterance summary length constraint requiring that each party utterance summary satisfies an upper-bound party utterance summary length threshold, and
generating the extractive summarization based at least in part on the selected utterance subset and the selected keyword subset.

* * * * *